(12) United States Patent
Sullivan et al.

(45) Date of Patent: Jan. 17, 2023
(10) Patent No.: US 11,557,217 B1

(54) COMMUNICATIONS TRAINING SYSTEM

(71) Applicant: Aptima, Inc., Woburn, MA (US)

(72) Inventors: Kevin Sullivan, Burlington, MA (US); Matthew Roberts, North Chelmsford, MA (US); Michael Knapp, Orlando, FL (US); Brian Riordan, Pennington, NJ (US)

(73) Assignee: Aptima, Inc., Woburn, MA (US)

( * ) Notice: Subject to any disclaimer, the term of this patent is extended or adjusted under 35 U.S.C. 154(b) by 0 days.

(21) Appl. No.: 17/080,375

(22) Filed: Oct. 26, 2020

Related U.S. Application Data

(63) Continuation of application No. 15/437,399, filed on Feb. 20, 2017, now Pat. No. 10,818,193.

(60) Provisional application No. 62/296,631, filed on Feb. 18, 2016.

(51) Int. Cl.
| | |
|---|---|
| G09B 5/04 | (2006.01) |
| G09B 5/06 | (2006.01) |
| G09B 5/02 | (2006.01) |
| G06F 40/30 | (2020.01) |
| G09B 19/04 | (2006.01) |
| G10L 15/187 | (2013.01) |
| G10L 15/26 | (2006.01) |
| G09B 9/00 | (2006.01) |

(52) U.S. Cl.
CPC .............. *G09B 5/04* (2013.01); *G06F 40/30* (2020.01); *G09B 5/02* (2013.01); *G09B 5/062* (2013.01); *G09B 9/003* (2013.01); *G09B 19/04* (2013.01); *G10L 15/187* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 6,134,527 | A | * | 10/2000 | Meunier ............... G10L 15/063 704/239 |
| 10,290,221 | B2 | | 5/2019 | Stacy et al. |
| 10,431,106 | B1 | | 10/2019 | Tolland et al. |
| 10,552,764 | B1 | | 2/2020 | Carlin |
| 10,818,193 | B1 | | 10/2020 | Sullivan et al. |

(Continued)

OTHER PUBLICATIONS

Yen, Jason Tahai, Office Action Detail for U.S. Appl. No. 15/437,399, filed Feb. 20, 2017, dated Jul. 5, 2019, 15 pgs.

(Continued)

*Primary Examiner* — Jason T Yen
(74) *Attorney, Agent, or Firm* — John J. Brooks III

(57) ABSTRACT

A communications training system is provided having a user interface, a computer-based simulator and a performance measurement database. The user interface is configured to receive a speech communication input from the user based on a training content and the computer-based simulator is configured to transform the speech communication to a text data whereby the text data can be aligned to performance measurement database values to determine a performance measure of the speech communication. The format of the text data and the performance measurement database values enable the speech communication to be aligned with pre-defined performance measurement database values representing expected speech communications for that training content.

18 Claims, 18 Drawing Sheets

(56) References Cited

U.S. PATENT DOCUMENTS

| | | | |
|---|---|---|---|
| 2005/0108775 A1* | 5/2005 | Bachar | H04M 3/4936 725/135 |
| 2008/0140398 A1 | 6/2008 | Shpigel | |
| 2010/0062403 A1* | 3/2010 | Williams | G09B 5/065 434/185 |
| 2013/0173260 A1* | 7/2013 | Ahmadshahi | G10L 15/26 704/201 |
| 2014/0297277 A1* | 10/2014 | Zechner | G06F 40/35 704/235 |
| 2014/0322691 A1* | 10/2014 | Yavari | G09B 5/04 434/321 |
| 2015/0073790 A1 | 3/2015 | Steuble et al. | |
| 2016/0365090 A1* | 12/2016 | Nissan | G10L 15/19 |
| 2017/0116870 A1 | 4/2017 | Brem et al. | |

OTHER PUBLICATIONS

Yen, Jason Tahai, Office Action Detail for U.S. Appl. No. 15/437,399, filed Feb. 20, 2017, dated Jan. 15, 2020, 17 pgs.

Yen, Jason Tahai, Notice of Allowance for U.S. Appl. No. 15/437,399, filed Feb. 20, 2017, dated Mar. 30, 2020, 21 pgs.

Yen, Jason Tahai, Notice of Allowance for U.S. Appl. No. 15/437,399, filed Feb. 20, 2017, dated Jun. 17, 2020, 21 pgs.

Berglie, S. T. & Gallogly, J. J., Collaboration between human and nonhuman players in night vision tactical trainer-shadow. Proceedings of SPIE 9848, Modeling and Simulation for Defense Systems and Applications XI, 984803, May 12, 2016, 13 pgs., Orlando, FL.

Department of the Army, The U.S. Army Training Concept 2012-2020. (TRADOC PAM 525-8-3), Jan. 7, 2011, 108 pgs., Fort Monroe, VA.

Flaherty, S. R. & Bink, M. L., Training manned-unmanned teaming skills in Army Aviation. Proceedings of International Symposium on Aviation Psychology, May 4, 2015, 6 pgs., Dayton, OH.

Shute, V. J., Focus on Formative Feedback. Review of Educational Research, 78(1), 2008, pp. 153-189, 37 pgs., USA.

Stewart, J. E., Bink, M. L., Dean, C.R., & Zeidman, T., Developing performance measures for manned-unmanned teaming skills (ARI Research Report 1983), Feb. 2015, 57 pgs., U.S. Army Research Institute for the Behavioral and Social Sciences, (DTIC No. ADA614047), Arlington, VA.

Sticha, P. J., Howse, W. R., Stewart. J. E., Conzelman, C E., & Thibodeaux, C., Identifying critical manned-unmanned teaming skills for unmanned aircraft system operators, (ARI Research Report 1962), 2012, 68 pgs., U.S. Army Research Institute for the Behavioral and Social Sciences, (DTIC No. ADA565510), Fort Belvoir, VA.

Sultan, M. A., Bethard, S., & Sumner, T., Back to Basics for Monolingual Alignment: Exploiting Word Similarity and Contextual Evidence, 2014, 12 pgs , Transactions of the Association for Computational Linguistics, USA.

Gross, A., et al., "IITET and Shadow TT—An Innovative Approach to Training at the Point of Need", Proc. SPIE+DSS, 2014, 10 pgs., VA, USA.

Simulation Interoperability Standards Organization, Inc. (SISO), Product Nomination for Human Performance Markup Language, dated May 9, 2016, 16 pgs., SISO, Orlando, FL.

Advanced Simulation Technology, Inc., "Construct User Guide". Accessed online at http://support.asti-usa.com/media/pdf/construct.pdf on Jan. 7, 2016. 11 pgs.

Stacy, Webb; Ayers, Jeanine; Freeman, Jared; Haimson, Craig, "Representing human performance with human performance measurement language." Proceedings of the Fall 2006 Simulation Interoperability Workshop. Jul. 2006. Florida, USA. 11 pgs.

Aptima, Inc., "HPML Schema" User Guide. 2014. Massachusetts, USA. 116 pgs.

Vygotsky, L. S. "Mind and society: The development of higher mental processes". Oct. 1980, Cambridge, MA: Harvard University Press. 91 pgs.

Anderson, John Robert, "The Architecture of Cognition", 1983, Cambridge, MA, Harvard University Press, USA, 60 pgs. (pp. 1-109).

Anderson, John Robert, "The Architecture of Cognition", 1983, Cambridge, MA, Harvard University Press, USA, 60 pgs. (pp. 110-229).

Anderson, John Robert, "The Architecture of Cognition", 1983, Cambridge, MA, Harvard University Press, USA, 58 pgs. (pp. 230-345).

* cited by examiner

| State transition table | | | |
|---|---|---|---|
| Current state<br>Input | State A | State B | State C |
| Input X | ... | ... | ... |
| Input Y | ... | State C | ... |
| Input Z | ... | ... | ... |

1. Acknowledgements of commands from vehicle:
   - Example: "Roger Car33. We will continue to observe the house and report protesters."
2. Acknowledgements of statements by manned aircraft:
   - Example: "Roger, I copy house at location XYZ."
3. SPOT reports to other vehicles:
   - Example: "Car06, I found a single story dark red house without a courtyard. It is next to a two story home with light green trim. There is no activity around the house. I see several cars, but not a black Toyota Corolla. The house is located at location ABC. Found it at 0942AM. I will continue to observe the house and report any activity."
4. Clarification questions to manned aircraft
   - Example: "Car44 this is UAS12. Do you have the white pickup heading north from the parking lot?"

Table 1: Notional example communications by a UAS operator.

FIG. 9

```xml
<DataRequest ID="AircraftLocation" Select=".WorldLocation.X, .WorldLocation.Y, WorldLocation.Z"
        From="ObjectRoot.BaseEntity.PhysicalEntity.Platform.Aircraft"
        Where="Marking == %P%Rotary_Marking">
    <Parameter Name="Marking" Type="String"/>
</DataRequest>

<MeasurementTemplate ID="CrossedAltitudeThreshold" Continuity="CONTINUOUS">
    <Description>Measure to determine if aircraft broke the altitude threshold</Description>
    <ConstantValue Name="MaxAltitude" Type="Int32" Value="4000" Units="feet"/>
    <Parameter Name="Aircraft_Marking" Type="String"/>
    <MeasurementComputation Operator="GREATER_THAN">
        <MeasurementComputation Operator="FUNCTION_CALL" FunctionName="Altitude">
            <DataRequestRef Ref="AircraftLocation">
                <ParameterValue Name="Marking" InputType="PARAMETER_REF" Value="Aircraft_Marking"/>
            </DataRequestRef>
        </MeasurementComputation>
        <ConstantRef Ref="MaxAltitude"/>
    </MeasurementComputation>
</MeasurementTemplate>

<MeasurementDefinition fromTemplate="CrossedAltitudeThreshold" ID="AC1_CrossedAltitudeThreshold">
    <ParameterValue Name="Aircraft_Marking" Value="AC1"/>
</MeasurementDefinition>
```

Table 2: Sample HPML describing a Maximum Altitude performance measure

FIG. 10

| Event Type | Slots of Utterance |
|---|---|
| SPOT Report | Target description with count, location, time |
| Battle Damage Assessment Report | Target location, time, target description with count, status |
| Remote Hellfire Report | Warning order, friendly location, target location, target description with count, remarks |
| Call for Fire Report | Warning order, target description with count, fire control, engagement, location, time |
| Target Handover Report | Warning order, target location, target description with count, remarks |
| Close Air Support Report | IP/BP, heading, distance, target location, target description with count, friendly location, egress |

FIG. 11A

| Numbers | | Target Descriptions | | Activities | |
|---|---|---|---|---|---|
| Description | Class | Description | Class | Description | Class |
| one | 1 | persons | 1 | carrying rpgs | 1 |
| two | 1 | personnel | 1 | holding rpgs | 1 |
| three | 1 | individuals | 1 | carrying weapons | 2 |
| four | 1 | dismounts | 1 | looking suspicious | 3 |
| five | 1 | men | 2 | | |
| six | 1 | soldiers | 2 | | |
| seven | 1 | troops | 2 | | |
| eight | 1 | insurgents | 2 | | |
| nine | 1 | guys | 3 | | |
| single | 1 | folks | 3 | | |
| several | 2 | | | | |
| lot of | 2 | | | | |
| bunch of | 2 | | | | |
| some | 2 | | | | |
| many | 2 | | | | |

FIG. 11B

| Numbers | | | Target Descriptions | | | | Activities | | |
|---|---|---|---|---|---|---|---|---|---|
| Description | Class | Weight | Description | Class | Weight | Constraint | Description | Class | Weight |
| one | 1 | 1.000 | persons | 1 | 1.000 | 5 | carrying rpgs | 1 | 1.000 |
| two | 1 | 1.000 | personnel | 1 | 1.000 | 5 | holding rpgs | 1 | 1.000 |
| three | 1 | 1.000 | individuals | 1 | 1.000 | 5 | carrying weapons | 2 | 0.666 |
| four | 1 | 1.000 | dismounts | 1 | 1.000 | 5 | looking suspicious | 3 | 0.333 |
| five | 1 | 1.000 | men | 2 | 0.666 | 5 | | | |
| six | 1 | 1.000 | soldiers | 2 | 0.666 | 5 | | | |
| seven | 1 | 1.000 | troops | 2 | 0.666 | 5 | | | |
| eight | 1 | 1.000 | insurgents | 2 | 0.666 | 5 | | | |
| nine | 1 | 1.000 | guys | 3 | 0.333 | 5 | | | |
| single | 1 | 1.000 | folks | 3 | 0.333 | 5 | | | |
| several | 2 | 0.500 | | | | | | | |
| lot of | 2 | 0.500 | | | | | | | |
| bunch of | 2 | 0.500 | | | | | | | |
| some | 2 | 0.500 | | | | | | | |
| many | 2 | 0.500 | | | | | | | |

FIG. 11C

| Size Feedback | | | Activity Feedback | | |
|---|---|---|---|---|---|
| Feature | Class | Feedback | Feature | Class | Feedback |
| NoNumber | 0 | The number of target persons was missing. | NoActivityClass | 0 | A valid activity description was missing. |
| NoDescription | 0 | A description of the target persons were missing. | ActivityClass | 1 | N/A |
| UsedCardinalNumeral | 2 | Your description should be specific about the number of target persons. | ActivityClass | 2 | The correct activity is "carrying an rpg 7". Be more specific. |
| UsedCardinalNumeral | 1 | N/A | ActivityClass | 3 | Your description of the activity of the enemy was too vague. |
| ExceededDescrNumConstraint | 1 | You mentioned too many targets. | | | |
| ExceededDescrNumConstraint | 2 | You mentioned too many targets. | | | |
| ExceededDescrNumConstraint | 3 | You mentioned too many targets. | | | |
| DescriptionClass | 1 | N/A | | | |
| DescriptionClass | 2 | The correct description was persons, people, or individuals. Specific descriptions of persons involved in the "activity" provide better context from which to make decisions. | | | |
| DescriptionClass | 3 | The correct description was persons, people, or individuals. You should avoid using informal language. Specific descriptions of persons involved in the "activity" provide better context from which to make decisions. | | | |

FIG. 11D

COMMUNICATIONS TRAINING SYSTEM

CROSS-REFERENCE TO RELATED APPLICATIONS

This application is a Continuation application of U.S. application Ser. No. 15/437,399, filed on Feb. 20, 2017 entitled "SYSTEMS AND METHODS OF POWER MANAGEMENT"; U.S. application Ser. No. 15/437,399 claims the benefit of U.S. App. No. 62/296,631, filed on Feb. 18, 2016, entitled "SYSTEMS AND METHODS FOR COMMUNICATIONS TRAINING," the entire contents of both are incorporated herein by reference.

STATEMENT REGARDING FEDERALLY SPONSORED RESEARCH OR DEVELOPMENT

This invention was made with Government support under Contract #W911NF-14-C-0110 and awarded by the U.S. Army. The U.S. Government has certain rights in the invention.

REFERENCE TO SEQUENCE LISTING, A TABLE, OR A COMPUTER PROGRAM LISTING COMPACT DISC APPENDIX

Not Applicable

BACKGROUND OF THE INVENTION

Communication is necessary in any organization to meet the goals of the organization. For example, in an environment that requires precise and frequent communication, the U.S. Army faces a number of challenges as it moves to pursue formation of the Full Spectrum Combat Aviation Brigade (CAB). As the Army moves to this organizational structure, an important element is integration of unmanned aircraft systems (UAS) that provide increased battlefield range and endurance capabilities for both the Full Spectrum CAB and ground units the CAB supports. However, there are challenges as the Army grapples with issues of integration of UAS into the CAB, as the role of UAS is rapidly evolving from a traditional intelligence and surveillance role to a more active participant as a scout-reconnaissance asset that can designate and destroy targets. Accordingly, Manned-Unmanned Teaming (MUM-T) is emerging as a critical element of aviation operations. The challenge, however, is that UAS operators traditionally learn few of the scout-reconnaissance skills appropriate to MUM-T at the schoolhouse. Some of the critical skills not necessarily learned well at the schoolhouse includes communication and teamwork skills. There is a benefit therefore to provide opportunities for UAS operators to learn these critical skills. Consistent with the Army Learning Model (ALM), these opportunities may enable learning across institutional, operational, and self-development domains, necessitating an increasing reliance on novel training tools that facilitate practice with respect to communications, with associated feedback tools to guide learning. More generally, in the Army of the future, such teaming between manned and unmanned assets both on the ground and the air will become ubiquitous, necessitating training strategies that build the required skills for mission effectiveness.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

Embodiments of the disclosed communications training systems and methods of their use enable an individual student to practice communications and coordination in individual or teaming scenarios by incorporating synthetic entities and natural language processing into simulators/trainers that emulate voice and chat interactions, without requiring live pilots and other participants. In addition, the simulator/trainer may be integrated with the performance measuring software. The systems and methods incorporate a system architecture that predefines system elements such that training events may be presented to a system user and the system can capture responses in a manner that allows for accurate understanding of the state of the student and accurate measurement of the student's performance. The system architecture may include data storage and retrieval format to enable this measurement. The system may also include processor or computer-based simulators that include features for natural language processing that can evaluate student teamwork and communications for completeness, accuracy, order, brevity, and timeliness of the interactions to enhance their learning. The systems and methods may also automate objective performance measurements without the need for live observation and may also provide instructors with detailed assessments of the student for feedback and after action reviews.

In one example embodiment, the systems and methods may be used to train an unmanned aircraft systems (UAS) operator to better communicate in their operational environment.

In some embodiments, the systems and methods may be used to train workers that work in a distributed work environment and communicate with other workers over a communications network.

In some embodiment, the communications training systems and methods of use allow student interaction and learning through the use of voice and data messaging within the training environment. The systems and methods apply the technology of natural language processing modules to enable simulated or synthetic entities to understand and generate natural language relevant to the training environment. In some embodiments, the systems may incorporate technical products such as Voisus (for speech recognition) and Construct (for speech generation) into the training environment to enable accurate speech recognition, to include speech to text and text to speech, functionality. Utilizing technology that transforms voice data to text further allows the systems to enhance the performance measurement capability of the training environment allowing the student to receive feedback with or without the need for an observer. The system may also be configured to store training session data for replay by the student and the instructor. The system has a 'gold standard' of what each expected utterance should sound like as recorded by an expert. The feedback modules of the system can show the instructor the progress of the individual trainee or student and a larger group or unit. The feedback module allows instructors to identify trends, and adjust training curriculum.

Embodiment of the systems and methods provide a rich learning environment that allows students to develop their skills without the need for instructors, live role players or pucksters to support them. This may be accomplished by:

Applying intelligent synthetic entities that can understand and produce speech. Enabling students to use the communication modality that is actually used in practice, spoken language synthetic entities dramatically increase the fidelity of the training. In addition, intelligent synthetic entities can improve the quality of training available to students by allowing fine-grained control of the training content and avoiding the inconsistency of human white force role players or instructors with differing skill levels, different ways of communicating, and different levels of motivation.

Including embodiments of automated performance assessment tools that can assess both the behaviors and communications of the student in real time. This assessment data will provide diagnostic feedback to the student so that they are not only informed when they performed well or poorly, but also of what specifically they did that led to the assessment. This diagnostic performance assessment will allow the student to effectively learn independently.

Using the performance data to select or adapt training in a way that helps to keep the student engaged and the training content within the student's zone of proximal development.

In one example embodiment, a computer-based communications training system is provided comprising a memory configured to store a training content data set comprising a training event data, the training event data defining a simulation data and an event type, a user interface configured to present the simulation data to a student and receive a response data of the student to the simulation data, a communication platform configured to receive the response data of the student and transform the response data to a text data, an interaction manager module configured to receive the text data to determine an event data and a measurement environment configured to determine an event measure for the student based on the event data and the event type. In some embodiments, the response data of the student is a verbal response of the student. In some embodiments, the interaction manager module is further configured to present an audio data to the student based on the simulation data and the response data. In some embodiments, the event measure of the student comprises one event measure selected from the group consisting of: an accuracy event measure, a completeness event measure, a timeliness event measure, a brevity event measure and an order event measure. In some embodiments, the response data of the student comprises an utterance of the student, the event type comprises an utterance type and the event measure of the student comprises an utterance type score of the student.

In some embodiments of the computer-based communications training system, the utterance type comprises one or more utterance slot, the event measure of the student comprises an accuracy event measure and the accuracy event measure is determined by the method of: aligning the utterance of the student with the one or more utterance slot whereby one or more utterance slot score can be determined, and determining the accuracy event measure for the event type from the one or more utterance slot score.

In some embodiments of the computer-based communications training system, the utterance type comprises one or more utterance slot, the event measure of the student comprises a completeness event measure and the completeness event measure is determined by the method of: aligning the utterance of the student with the one or more utterance slot, determining whether the utterance slot is filled or not filled by the utterance of the student, and determining the completeness event measure as a percentage of the one or more utterance slot of the event type filled by the utterance of the student.

In some embodiments of the computer-based communications training system, a time between the presentation of the simulation data to the student and the receipt of the response data defines an utterance response time, the event measure of the student comprises a timeliness event measure, and the timeliness event measure is determined by comparing the utterance response time of the student to an expected utterance response time.

In some embodiments of the computer-based communications training system, the utterance type comprises one or more utterance slot, the utterance slot defining one or more brevity terms and the event measure of the student comprises a brevity event measure determined by the method of: aligning the utterance of the student with the one or more utterance slot and the one or more brevity terms to determine one or more utterance slot brevity score and determining the brevity event measure from the one or more utterance slot brevity score.

In some embodiments of the computer-based communications training system, the utterance type comprises one or more utterance slot in an expected utterance slot order, the utterance of the student defining a response data order, and the event measure of the student comprises an order event measure is determined by the method of: aligning the utterance of the student with the one or more utterance slot and comparing the response data order to the expected utterance slot order to determine the order event measure.

In some embodiments of the computer-based communications training system, the response data comprises an actual utterance of the student, the event measure type comprises an utterance type, the measurement environment comprises a predefined utterance template, the interaction manager module configured to align the event data of the student to the utterance template to define the utterance slot score as the event measure for the student.

In some embodiments of the computer-based communications training system, the measurement environment further comprises a performance score algorithm, a predefined performance scoring data comprising a performance measure type, the performance measure type corresponding to one or more training events, the performance data comprising an event measure of the one or more training events, and the interaction manager module is configured to execute the performance score algorithm to determine a student performance score from the performance data as the performance measure for the student.

In one example embodiment, a method of providing a performance assessment of a student in a training simulator is provide, the method comprising selecting a training event from a training content, the training content comprising a training event, the training content corresponding to an expected performance data, presenting the training event to a student, receiving a speech communication as a response of the student to the training event, transforming the speech communication to a text data, aligning the text data to the expected performance data to define an event measure, determining a performance assessment from the event measure, and providing the performance assessment to a user interface.

In some embodiments, the methods and systems for communications training are inextricably tied to specifically designed computer-based user interfaces and specifically designed computer-based simulators that train and assess a student's verbal communications against a training content/ scenario and predefined performance measures of verbal communication.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9 shows a Table 1 illustrating a notional example of communications by a UAS operator;

FIG. 10 shows a Table 2 illustrating a sample HPML describing a Maximum Altitude performance measure;

FIG. 11A illustrates an example of a slot template showing slots for utterances for each event type;

FIG. 11B illustrates an example of abbreviated legal SME phrases or utterances for a SPOT report event type;

FIG. 11C illustrates an example of abbreviated SME descriptions for SPOT report with weight and constraint columns defined; and FIG. 11D illustrates and example feedback table which specifies feedback messages according to features and classes of phrases or utterances.

DETAILED DESCRIPTION OF THE INVENTION

Figure 1:
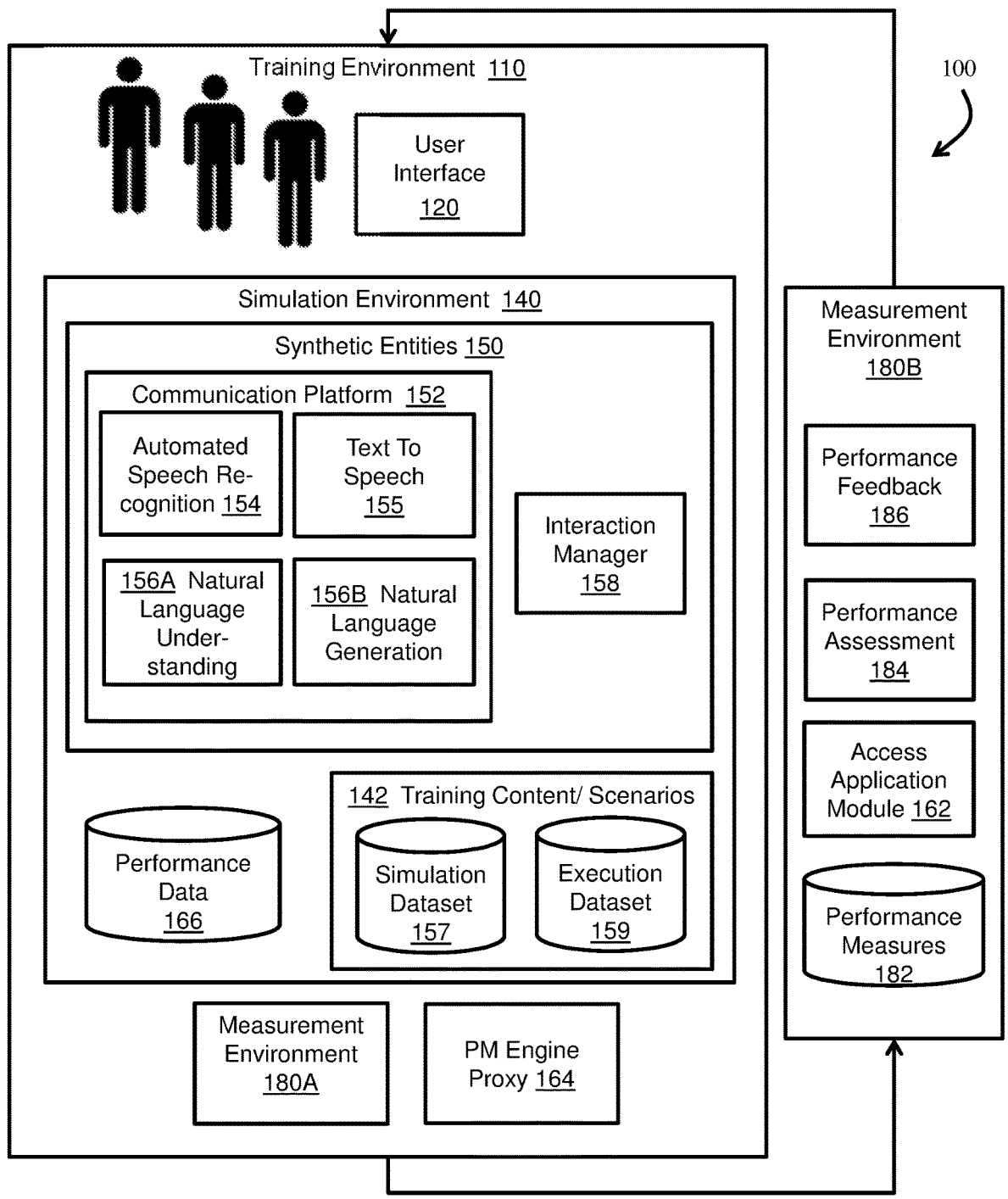
FIG. 1 illustrates a process diagram illustrating the general methods of one embodiment of systems and methods for communications training.

Systems and methods for communications training will now be described in detail with reference to the accompanying drawings. It will be appreciated that, while the following description focuses on a system that provides training and performance management for UAS operators, the systems and methods disclosed herein have wide applicability. For example, the communications training methods described herein may be readily employed for computer-based training with any role relying on proper communications such as remote help desk personnel, call-center personnel, air traffic controllers, emergency responders, financial and legal professionals or hospital personnel. Notwithstanding the specific example embodiments set forth below, all such variations and modifications that would be envisioned by one of ordinary skill in the art are intended to fall within the scope of this disclosure.

To incorporate communication skills, the communications training systems and their methods of use may integrate technology components such as automated speech recognition (ASR), text to speech (TTS) synthesis, and natural language processing (NLP). Using these technology components in a computer-based training environment may provide a more natural mode of interaction, closely replicating a live mission environment, enabling training for critical voice communication skills. Additionally, they may incorporate technology components such as a performance assessment technology (PM Engine) and performance assessment server application technology (ASA). These products enable a richer performance feedback (After Action Report (AAR)) and also allow for the simulator/trainer system to adapt to student performance.

In some embodiments, the communications training systems may include real time adaptation by enabling the synthetic entities to consider student's performance when determining their next behavior or response. In some embodiments, the systems may include intra-scenario adaption to help select the next scenario based on a student's past performance. In some embodiments, selection the next scenario may be provided by the methods and systems disclosed in co-pending U.S. patent application Ser. No. 15/395,574 filed on Dec. 30, 2016 entitled "MACHINE LEARNING SYSTEM FOR A TRAINING MODEL OF AN ADAPTIVE TRAINER" which is herein incorporated by reference in its entirety. In some embodiments, selection the next scenario may be provided by the methods and systems disclosed in co-pending U.S. patent application Ser. No. 14/143,410 filed on Dec. 30, 2013 entitled "PROBABILISTIC DECISION MAKING SYSTEM AND METHODS OF USE" which is herein incorporated by reference in its entirety. In some embodiments, measurement of student performance data may be provided by the methods disclosed in co-pending U.S. patent application Ser. No. 15/098,216 filed on Apr. 13, 2016 entitled "SYSTEMS AND METHODS TO MEASURE PERFORMANCE" which is herein incorporated by reference in its entirety.

Some embodiments of the disclosed systems and methods enable an individual student to practice communications and coordination in teaming scenarios by incorporating synthetic entities and natural language processing technology that emulates voice and chat interactions, without requiring live pilots and other participants. In addition, the simulator/trainer may be integrated with performance measuring technology. The systems and methods incorporate technology, tailored for natural language processing, that can evaluate student communications for completeness, accuracy, order, brevity, and timeliness of the interactions and enhances their learning. The systems and methods may also automate objective performance measurements without the need for live observation and may also provide instructors with detailed assessments and constructive context-sensitive feedback of the student performance for after action reviews.

In some embodiments, the systems and methods may be used to train distributed team members that require verbal communication to accomplish tasks done by different members of the team.

In some embodiments, the systems and methods are directed to train a student that needs to analyze a situation or receive a communication and respond (or dialogue) in a structured manner where content, accuracy, completeness, and timeliness is important (e.g. a 911 operator, who must i) ascertain critical information and ii) use it for dispatching resources). Similarly, this could apply to training air traffic controllers for work controlling air traffic in an airport. Other uses of the system and methods could extend to monitoring not just the content, but other sensors associated with the communication (such as volume, pitch, intensity) and even other physical sensors of the operator (such as heart rate, and galvanic skin response) to indicate the operator's ability to control and manage their stress levels while maintaining accurate communications. The systems and methods may also apply to training operators where the receiving systems had limited understanding and ability to parse unstructured communications. This might occur in human-machine teaming situations, where a human needs to communicate verbally (or textually) with a robot (or team of robots) or other artificial entities. Also, for creating any structured reports (such as weather reports). Also, this could be used when communicating reports to people who have limited English vocabularies.

Figure 2A:
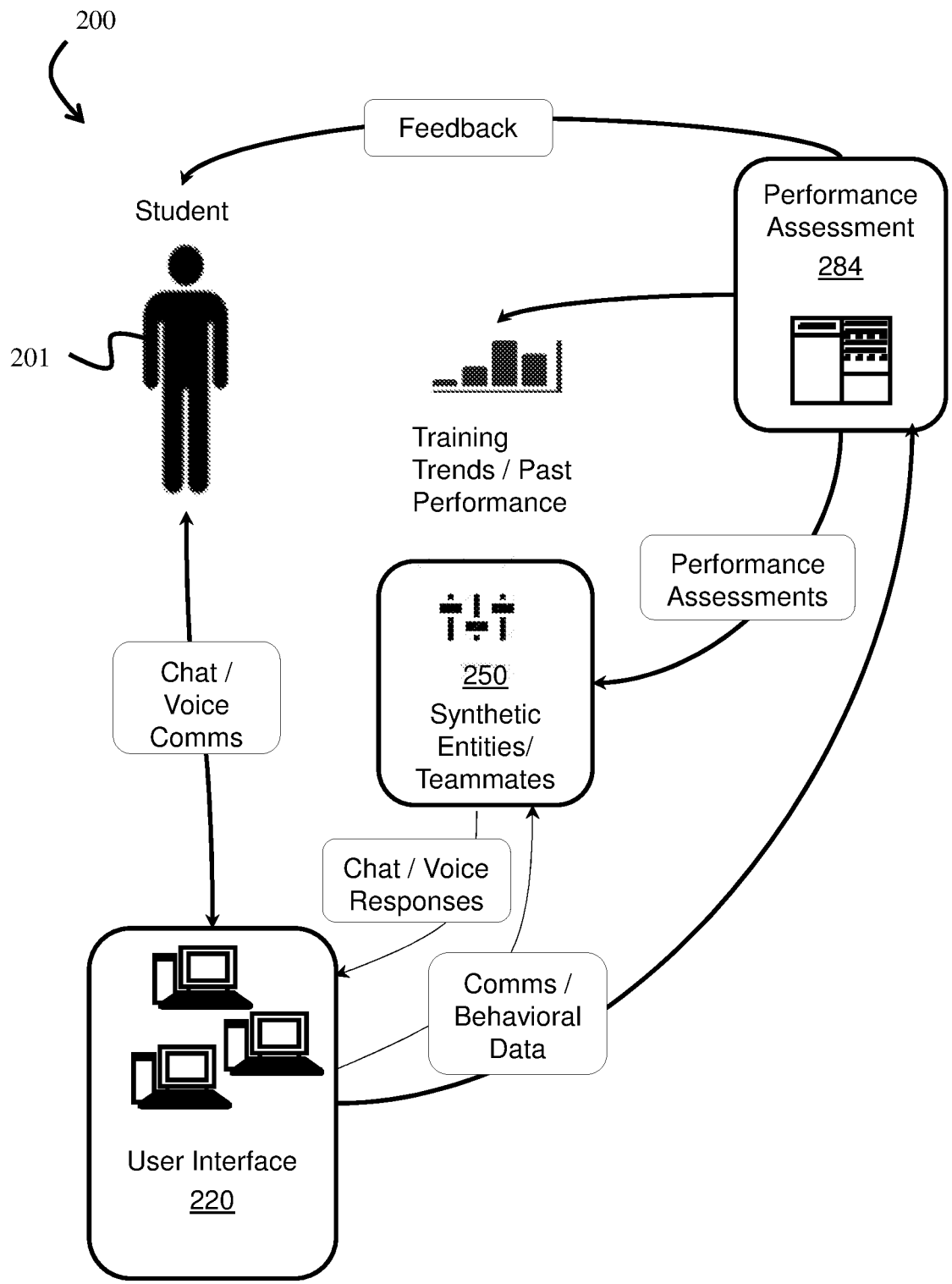
FIG. 2A illustrates a functional overview of one embodiment of systems and methods for communications training.

In one specific example embodiment, the systems and methods may be used to train a UAS operator to better communicate in their operational environment. To illustrate this example embodiment, and not for limitation, to address the US Army's aviation training need, a single player student, simulation based simulator/trainer may be provided that focuses on training for UAS operators (see FIG. 2A). This simulator/trainer enables the training of skills in a setting where the student 201, as a UAS Payload Operator (PO), has a computer-based device loaded with the appropriate user interface 202 that is in communication with the other training environment elements. In this architecture, the highly interactive role of the Aircraft Operator (AO) is represented by the training system through simulated or synthetic entities 250, requiring no human operator. In addition, the student 201 can view his or her progress without the presence of a human instructor through the communications from the user interface 220 or as feedback from the performance assessment components 284 of the measurement environment. Human instructors can access student records and provide guidance when needed, as well. Performance assessments 284 may be assessed at the individual level as well as at different team and group levels. For example, performance may be assessed at a unit or team level or at a battalion level. Performance trends may also be assessed for individual students as well as teams or groups as the data for all sessions is in the ASA and visualized in an instructor dashboard. The student interacts with the training environment's client interface 220. In one embodiment, the client user interface 220 is comprised of a user portal for logging in, maintaining and viewing records, and accessing the simulator itself. The simulator user interface 220 may be specifically programed to closely resemble the configuration of tactical windows found in the actual equipment to be trained. The computer-based simulator may also have a specialized user interface device, as described below, to provide user input into the simulator/trainer. The computer-based simulator may be comprised of a client as a user interface 220 and an application backend to provide the other functions of the simulator and simulation environment. The client and backend may be hosted together in a stand-alone configuration or the application backend, such as a server and/or database, may be hosted over a network. Simulator and training results may be captured in a performance database that the student, instructor or other system component may access.

As used herein, the terms "module," "platform," "environment," and "engine" refer to hardware and/or software implementing entities and does not include a human being. The operations performed by the "module," "platform," "environment," and "engine" are operations performed by the respective hardware and/or software implementations, e.g. operations that transform data representative of real things from one state to another state, and these operations do not include mental operations performed by a human being.

One Embodiment of a Communications Training System

In one example embodiment, the communication training system generally provides a way to make a performance assessment of a student in a training simulator by: presenting a training event to the student in the training simulator, receiving a speech communication as a response of the student to the training event, transforming the speech communication to a text data, comparing the text data to a predefined simulation dataset to define a performance data and comparing the performance data to a predefined performance measure dataset to define the performance assessment of the speech communication. In some embodiments, the system further comprises elements to transform the text data to an HPML data wherein comparing the text data to a predefined simulation dataset comprises comparing the HPML data to a predefined simulation dataset. In some embodiments, the response of the student is used to define another training event to the student. In some embodiments, the presentation, response and assessment steps are iterated using multiple training events with multiple responses are used to make a performance assessment of the student.

The training environment generally represents the environment and system components the student interfaces and interacts with when receiving training. The training environment also collects data from the student's performance. The training environment may comprise a simulation environment with interfaces providing input from a student as well as output to the student. The simulation environment generally also comprises one or more synthetic entities and training content/scenarios. The synthetic entities generally communicate with a communication platform, a simulation dataset and an interaction manager module. From the student's performance with the simulation environment, the training environment tracks and provides a performance dataset for use by the performance measurement engine.

In some embodiments, a measurement environment is provided to provide the data for analyzing the performance dataset. The measurement environment generally comprises defined performance measures or scores, functions to assess the performance of the student against the performance measures and functions to provide feedback based on the performance assessment.

For illustration purposes and not for limitation, one example embodiment of a communications training system is shown in the high-level functional diagram of FIG. 1. As shown, the communications training system 100 generally comprises a system utilizing a training environment 110 and a measurement environment (PM Engine) 180B. The training environment 110 generally comprises the system components that provide the interaction with the student through a user interface 120 to the simulation environment 140 and the measurement environment 180B. The simulation environment 140 generally comprises the system components that define and execute the processes representing the simulation to the student. Within the simulation environment 140, synthetic entities 150 are provided that are also in communication with a training content/scenario database 142. The synthetic entities 150 generally comprise a communication platform 152 that interacts with a training content data 142 and an interaction manager module 158. The interaction manager module 158 generally uses data from the training content data 142 and the student's performance data 166 to determine how the student is performing and what should be presented to the student next. The simulation environment 140 may also be configured to communicate with a measurement environment 180A within the training environment 110.

The measurement environment 180B generally comprises the system components that provide measurement, assessment and feedback of the student's performance. The measurement environment 180B is distributed or separated from the training environment 110 but is in communication through a proxy (PM Engine proxy) 164. The measurement environment 180B may comprise components to include performance assessment module 184, a performance feedback module 186 and a performance measures database 182. In some embodiments, an access application module 162 is provided to provide access to measurement environment modules and the performance measures database 182.

The communications training system 100 may operate as a distributed, web-based simulation environment supporting multiple, simultaneous players executing unique missions. These system components are described in further detail below.

Figure 3A:
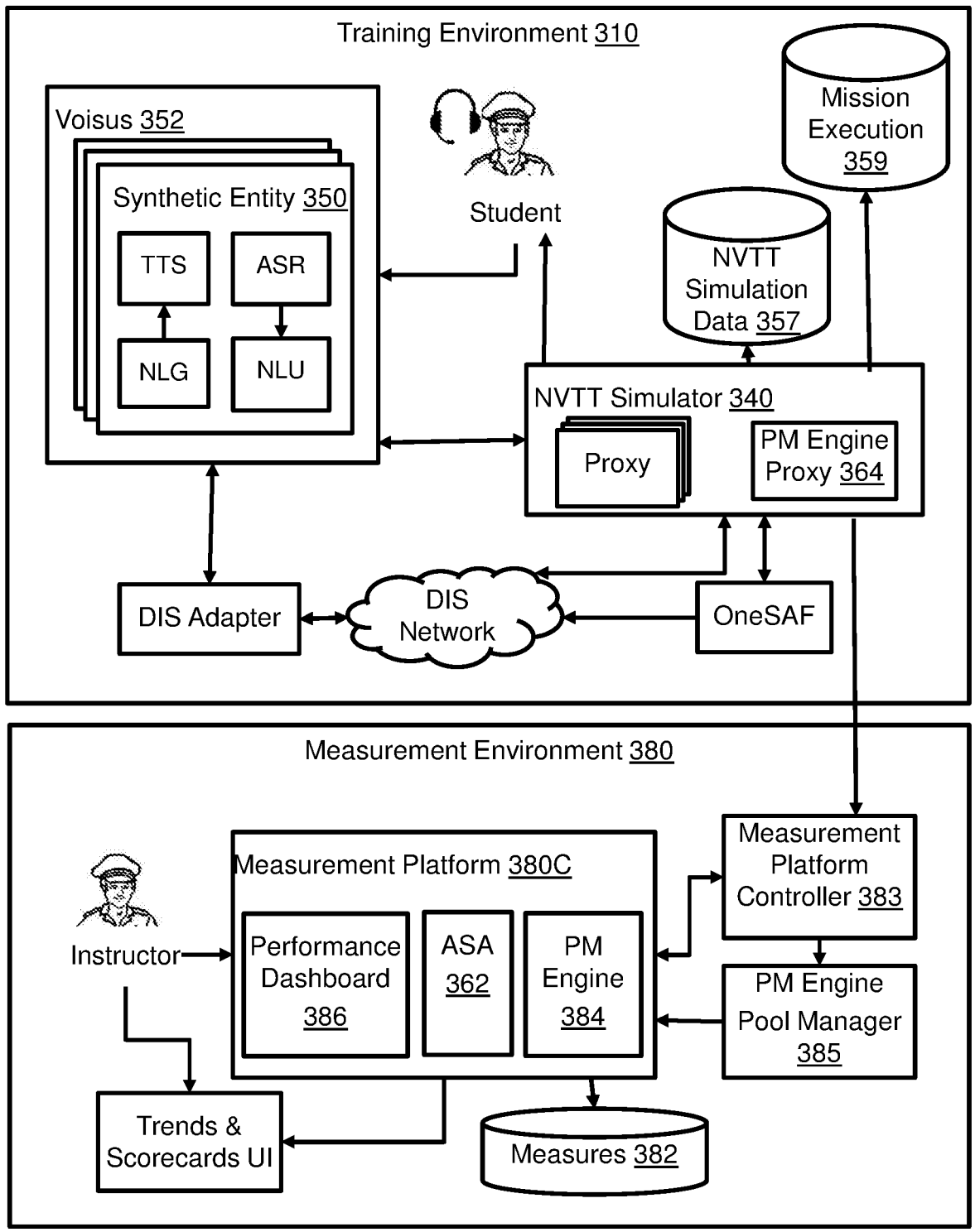
FIG. 3A illustrates a notional architecture for a an example embodiment of an communications training environment.

FIG. 3A also shows a system architecture of an example embodiment of a communications training system specific to a training environment for a NVTT training simulator. The communication platform, here Voisus 352, comprises representations for each synthetic entity 350 type and supports speech to text and text to speech interactions. As shown, speech to text is indicated by the Automatic Speech Recognition (ASR) module to Natural Language Unit (NLU) module relationship and text to speech is represented by the Natural Language Generation (NLG) module to Text to Speech (TTS) module components (Voice recognition server (ASTi Voisus)). The simulation environment, here NVTT Simulator 340 distributed from Voisus 352, provides the simulation data (event and scenario content) including the student's user interface (e.g., audio communication) and the air vehicle (e.g., visual stimulus) simulation. The NVTT simulator 340 contains proxies for interfacing to other training system architectural components as well as a PM Engine proxy 364. The NVTT simulation data 357 functions as the simulation dataset and the mission execution data 359 functions as the execution dataset. The One Semi-Automated Forces (OneSAF) provides additional simulation data such as contextual elements of the simulation including the terrain and simulated or synthetic entities on the terrain. These entities are observed and heard by the student playing the simulation. OneSAF includes the Night Vision Image Generator (NVIG). Computer communications between components may be made through a digital communications network such as the Internet or through any other type of communication network. For this embodiment, the training environment 310 is in communication with the measurement environment 380 through the PM Engine proxy 364, the measurement platform controller 383 and the PM Engine pool manager 385. The measurement platform 380C is a grouping of system components to include the performance dashboard 386 that provides the performance feedback functions, ASA 362 provides access to the performance measures database 382 and the PM Engine 384 provides the performance assessment functions.

Simulation Environment.

Referring to FIG. 1, the simulation environment 140 generally comprises those system components that define and execute the processes representing the simulation to the student. The simulation environment generally comprises a computer-based simulator having synthetic entities 150 and training content 142. Within the simulation environment 140, the synthetic entities 150 generally comprise the hardware and/or software implementing components that represent the entity that the student interacts with in the simulation environment 140. The training content/scenarios 142 are predefined data sets that define the training tasks and the simulation data necessary to present the content to the student through a user interface 120. The training content 142 also define the tools and data sets that are to be compared to the student's responses to determine the student's state and determine how they progress through the simulation.

User Interface.

Referring to FIG. 1, the user interface 120 may be any type of interface or device that allows the user to provide input to the simulation environment 140. In some embodiments, the use interface 120 may include a microphone to receive speech communications and a speaker or other device capable of simulating noise and speech communication. In some embodiments, the simulation interface 120 is a graphic user interface (GUI) configured to match the environment to be trained. For example, in one embodiment, the GUI reflects the actual UAS ground control station. The user interface 120 is intended to achieve an effective and realistic integration of communications user interfaces into the overall user experience. The user interface 120 may also include After Action Report (AAR) capability to include methods for presenting additional performance measures to the student, and enabling the review of communications made during the training. The user interface 120 may also include an instructor dashboard to represent the results and trends of the performance of multiple students.

In some embodiments, the user interface 120 to the simulated environment 140 may be through various specialized hardware communications devices, live communication devices or simulated communication devices presented through software clients and graphic user interfaces. These clients may provide networked voice communications on a variety of platforms to including PCs, tablets, generic hardware-based platforms or specifically designed platforms. These clients may support features such as simulated radio nets, intercom channels, realistic radio effects, point-to-point and conference calling, text chat and live radio communications and control.

Synthetic Entities.

As shown in FIG. 1, the synthetic entity 150 generally comprises the simulation or the entity that the student interacts with in the simulation environment 140. For example, the simulated entity may be another party in the scenario that the student has to communicate with. The other party may be represented by a set of predefined communications in system databases that are presented to the student to represent activities of that party in the scenario. To support realistic training, the specific decisions and actions the student makes should have an observable effect in the simulation environment. To support this, the synthetic entities 150 can reflect these decisions and actions. For example, the synthetic entity 150 may include synthetic operator voice technology as a stimulus and to produce speech responses to the student. The synthetic entities 150 may also be able to result in performance data that more accurately reflects detailed performance measures.

Figure 2B:
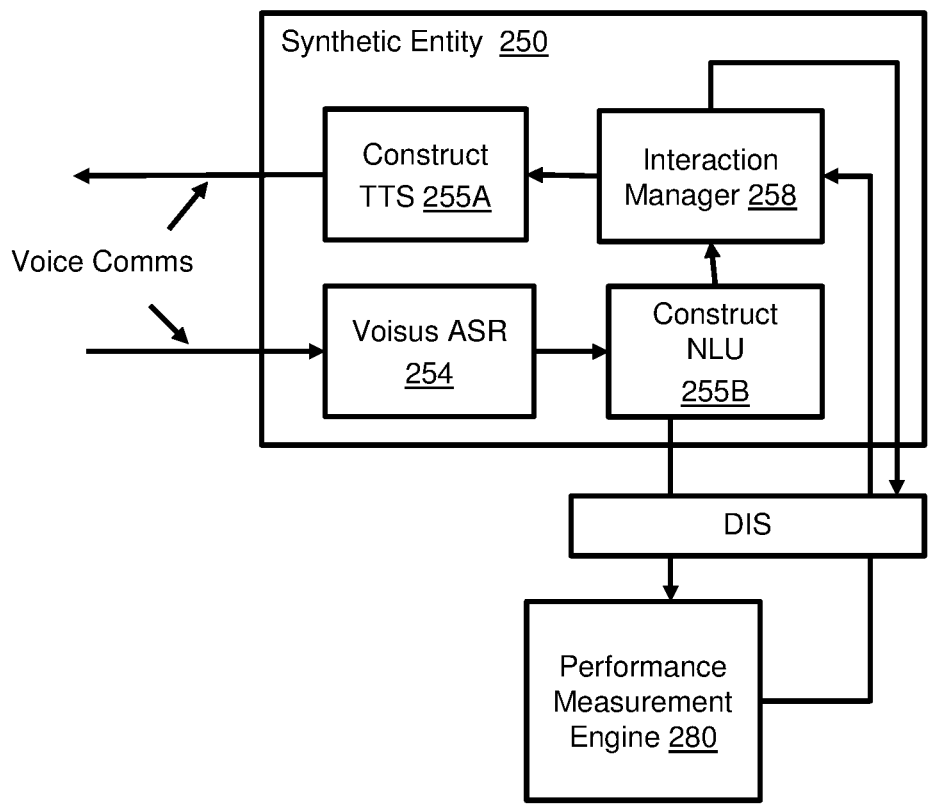
FIG. 2B illustrates an example embodiment of a general architecture for a synthetic entity.

As shown in more detail at FIG. 2B, one embodiment of the synthetic entity 250 generally comprises a processor or computer-based tool or technology, such as a computer software module (for example Construct and Voisus), that receives and provides communication with the student (for example voice communications) and an interaction with or includes the interaction manager 258. As shown, Voisus 254 provides ASR functionality and Construct provides TTS functionality 255A and NLP functionality (here shown as natural language understand (NLU) 255B). The synthetic entities 250 also may include or may be able to communicate over a distributed network such as DIS with a training content dataset (not shown) to provide training content/scenarios to the student and may be configured to communicate with a measurement environment such as performance engine 280.

Some embodiments of the synthetic entities may incorporate TTS and ASR functionality and technology similar to the transcription of voice communications systems and methods disclosed in US Pub. No. 2015/0073790, published on Mar. 12, 2015, U.S. application Ser. No. 14/480,388, filed Sep. 8, 2014 and herein incorporated by reference in its entirety. In some embodiments, the TTS functionality may include the features of the Construct tools as marketed and offered by Advanced Simulation Technology Inc. (ASTI) of Herndon Va. under the name of "Construct" and the ASR functionality may include the features of tools marketed and sold under the name of the "Voisus" product also offered by ASTI. The TTS and ASR functionality may include automated voice interactions including functionality to automate calls for interactions such as for: Air Traffic Control; Close Air Support/Call for Fire, GMDSS Communications; Medevac; and NBC reports. Construct automates the interactions to provide a hands-off tool for instructors, which reduces workload and role-playing demands. This functionality may reproduce the content and behavior of real-world communications inside the training system. The synthetic entities may follow the training communications plan and feature radios with realistic cryptography, propagation, and distortion effects. Students may be able to tune to multiple communications nets, each with mission-customized and contextually-accurate radio traffic. Students may be able to converse with the synthetic entities face-to-face in 3D event environments or over simulated radios. The TTS and ASR functionality may prevent near-empty airwaves and manpower-intensive role-playing in the computer-based simulator by creating intelligent entities that interact verbally with students. In some embodiments, the TTS and ASR functionality allows 3D positioning of voice and radio transmissions and may provide realistic radio noise and distortion effects. The addition of ASR, TTS, and NLP technologies further produce an environment that provides significant independence and flexibility for the student.

Training Content.

Referring back to FIG. 1, the training content 142 of the simulation environment 140 generally comprises the training events and situations presented to the student through the user interface and the computer-based simulator. In general, the training content is a predefined data set stored in a memory of the training simulator and comprises a simulation dataset 157 and an execution dataset 159.

The training content may be based on Training Missions and Campaign Missions. A Training Mission is a short exercise or training event to practice a small task (i.e. a 2-minute exercise to turn the radio to the correct channel, and to contact the ground observers, or maybe give a five line report). Training Missions may be introductory sessions on how to play the simulation or small tasks or events within larger Training Missions. A Campaign Mission is a longer (open-ended) scenario with a mission brief (i.e. things to accomplish like reconnoiter a large area, or find a downed plane) (or several things to do). In a Campaign Mission, the student might need to use several of the skills learned in the Training Mission. Campaign Missions are typically scored and do have feedback and have multiple events within them. Both the Training and Campaign Missions may be defined to be structured and reflective of realistic scenarios that support progressively more difficult training tasks. The methods for communications training may enhance existing scenarios and develop new scenarios to allow the student to train using ASR, TTS, and NLP capabilities.

Examples of training content include training events to train voice FM radio communications with scenario entities; to perform aerial reconnaissance and report on ground assets and activities; de-conflict airspace; conduct target hand-over to ground units; call for and adjust indirect reconnaissance zones; and request and designate targets for further reconnaissance.

Additional training content may include scenarios with more diverse reconnaissance zones that include multiple zones. Some embodiments may use pre-formatted communication menus with drop down fields.

The objective for each training event is to connect the current skill or task in the simulation environment with a communication skill using speech recognition. These training events or scenarios may be mapped to a list of critical communication skills. The proper communication skills and formats can be predetermined by subject matter experts (SMEs).

Figure 7A:
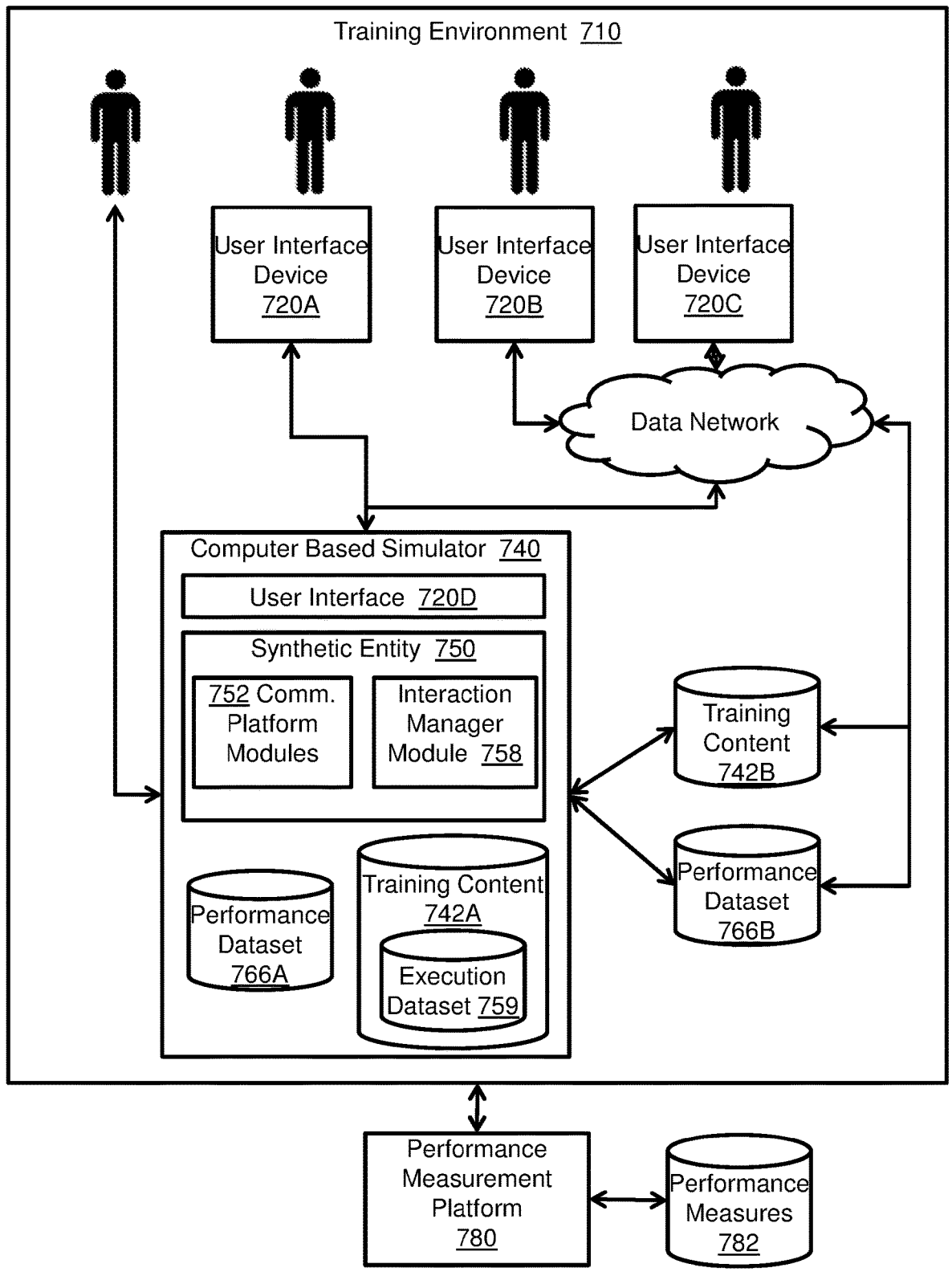
FIG. 7A illustrates a network diagram illustrating one example embodiment of the functional element of systems and methods for communications training.
Figure 7B:
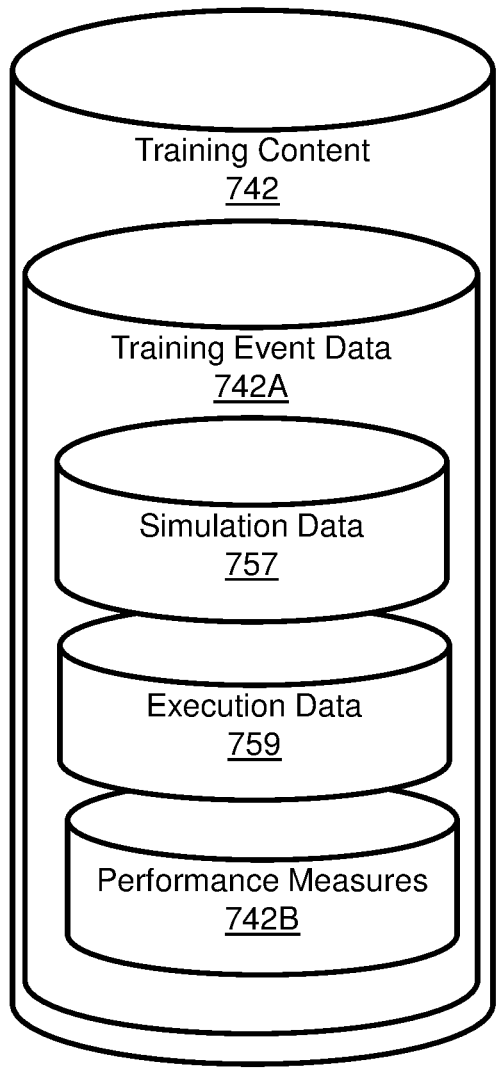
FIG. 7B illustrates one example of the different data components of training content.

As shown in more detail at FIG. 7B, the training content includes a training event data 742A comprising simulation data 757 and execution dataset 759. The simulation data 757 generally comprises an identification or definition of the simulation data needed for the simulator to perform the training event (e.g., text, audio or imagery data) and the execution data 759 generally comprises the data and tools necessary to analyze the response data from the student to determine how the student should progress through this event and the simulation. The training event data 742A may also include performance measures 742B for the training event or an identifier to access a distributed source of the performance measures for the training event.

Simulation Data.

Referring to FIG. 1, the simulation data, or simulation dataset 157 is used by the synthetic entities 150 to receive and provide feedback to students when presented the training content/scenarios. Simulation data 157 generally comprises the actual data, or an identification of the actual data so that it can be retrieved from another data source, needed by the interaction manager 158 to communicate events from the simulation to and from the simulation environment 140 and the user interface 120. For example, the simulation data 157 may comprises a tag or reference to call simulation data such as the image or communication data required for the training event. The simulation dataset 157 includes data to reflect the typical interactions between students and other assets that may be needed from the simulation environment 140. For example, typical interactions may include a textual representation of a spoken word or phrase and a corresponding meaning of the phrase. The simulation dataset 157 may reflect the true variation in speech and actions that is observed in actual training. The simulation datasets 157 may cover all the training scenarios of interest, including common missions as well as common lower-level events within missions. The simulation dataset 157 may include all relevant vocabulary and phrasings from the domain. More generally, the simulation dataset 157 may include variations in student utterances relative to the same stimuli (either spoken stimuli or events in the simulation). In one embodiment, the dataset 157 covers a variety of levels of student expertise and levels of performance. Examples of optimal performance, in particular, provide reference exemplars for developing and testing communications measures.

To develop and predefine the simulation dataset for the simulation environment, a representative dataset of student interactions may be used. A preliminary simulation dataset may also be comprised of synthesized dialogs that capture typical interactions between students and other assets in the environment. The simulation dataset may also comprise both synthetic data (manually developed) and actual data from training events. These simulation datasets may be used as development simulation datasets to help tune the speech recognition toolkit, tailor the natural language processing (NLP) module to the domain, develop the decision-making approach of the interaction manager, and implement the communications performance measures.

While extremely useful for initial development, these simulation datasets may still lack the true variation in speech and actions that is observed in actual training. In one embodiment, a preferred simulation dataset may be constructed from role-playing of students with white forces, or from student interactions recorded in other relevant simulation environments. If such data is difficult to acquire, data may also be derived from "Wizard-of-Oz" sessions comprised of a few students interacting with development team members playing the roles of synthetic entities in the simulation.

For development, the simulation dataset can be transcribed. Annotation may be helpful for development of some components. For example, for the NLP and interaction manager components, categorization of student utterances into domain-specific dialog acts may be required.

In some embodiments directed to UAS training, the simulation dataset may be based on an elucidation of the communications doctrine and phraseology used by UAS operators when communicating with Air Mission Commanders. The dataset may be used to tune the speech recognition language model to recognize UAS operator radio calls with high accuracy and to create speech templates for radio calls.

Execution Data.

Referring to FIG. 1, the execution data or execution dataset 159 generally comprises the data used by the interaction manager 158 to evaluate the response data within the training event and determine the output of the simulation environment 140 to that response. The execution data 159 generally comprises software and mathematical models to analyze the response data. In one embodiment, the execution data 159 defines state machines and state transition tables configured to take the current state and the input data and compare that data to a set of transition data to determine whether the student should transition to the next state. The state transition tables may contain predetermined values reflecting the inputs, states and updated states (as transitions or outputs) specific to that task or training scenario. In some embodiments, the state transition table may recognize a range or multiple types of input data to map to or otherwise align with a particular updated state and a corresponding transition. The execution dataset 159 may also include the state machines and tables that may be used by the interaction manager 159 to determine the state of the synthetic entity 150 based on the response data from the student.

Figures 4A, 4B:
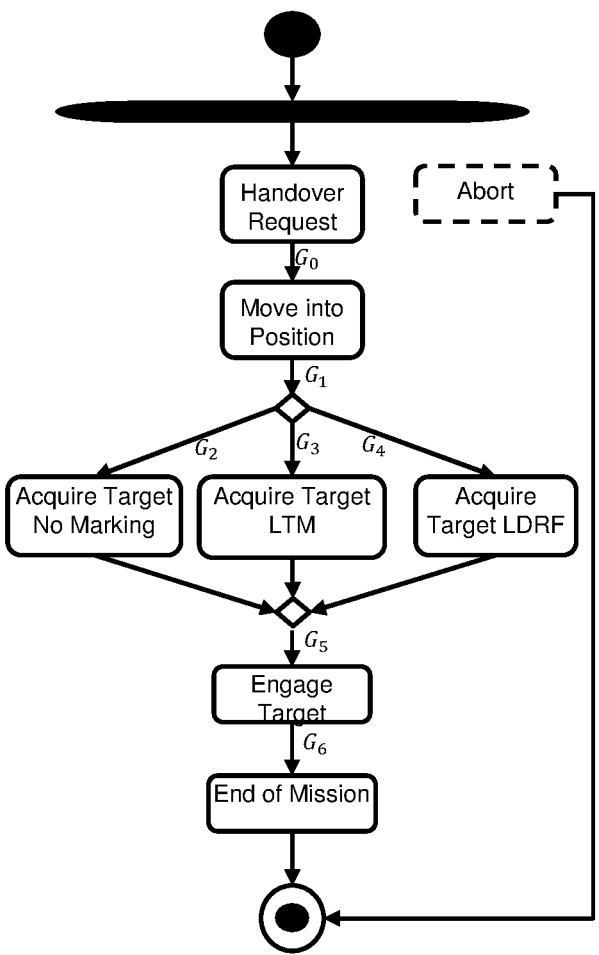
FIG. 4A illustrates a state diagram of an example embodiment of one example training mission.
FIG. 4B illustrates a state transition table of an example embodiment of one example training mission.

FIG. 4A illustrates an example of a state machine reflecting the state transitions through a training event. FIG. 4B illustrates and example of a state transition table generally comprising the predefined data populated in the state transition table to be the result of the comparison of the response (input) and state data to determine whether the state of the student should change. This transition data is formatted to be easily aligned or otherwise compared to the text data as generated from the actual response data.

Communication Platform.

Referring to FIG. 1, the communication platform 152 generally comprises the system components that provide the functionality providing the stimulus to the student as well as the functionality to receive and communicate the student's response to other components of the training system. For embodiments that verbally interact with the student, the communication platform 152 supports speech to text and text to speech interactions. As shown, speech to text is indicated by the Automatic Speech Recognition (ASR) module 154 to Natural Language Understanding (NLU) module 156A relationship. Text to speech is represented by the Natural Language Generation (NLG) module 156B to Text to Speech (TTS) 155 module relationship.

Automated Speech Recognition (ASR) Module.

Referring to FIG. 1, the automated speech recognition module 154 provides a customized speech recognition language model that transcribes student communication with high accuracy. In some embodiments, the transcription is in real-time or near real-time virtual multi-channel radio panel to communicate with simulation entities to affect aircraft maneuvers, weapon fires, support calls, and reconnaissance reports. Synthetic entities 150 may respond with real-time feedback based on speech and context presented by the simulation environment 140. The simulation environment 140 allows the student to select which channels to transmit and receive on, ensuring that h/she remain aware of which automated entity they are communicating with. The communication platform 152 utilizes automatic speech recognition (ASR) modules 154 tuned with application specific data followed by a natural language understanding (NLU) modules 156A that extract relevant meaning from the text. Multiple potential utterances can be collapsed into a single "extracted" meaning. For example, a student utterance of "Fly east" may have the same extracted meaning, as "Fly heading 090". The extracted meaning, based on both the content of the student transmission and the current simulation context within the mission, is used for real-time feedback as well as later performance scoring. The natural language generation module (NLG) module 156B and a text to speech (TTS) module 156 library generates realistic transmissions for real-time vocal responses to the student via a variety of doctrine and phraseology for utterance types such as SPOT and BDA reports, remote hellfire, and other radio interactions. The modules may have natural language capability and, hence, may be able to accurately transcribe even highly variable student speech. This may incorporate application specific phraseology, geography, call sign, and other data over the period of the scenario. The modules may also leverage SMEs to prioritize the phraseology and quickly provide tuning for the most used and most important communication. Collected transcripts and recordings (from the training system itself, other simulator/trainers, and real world operations, as available) may also be used in tests to determine the performance level of the speech recognition system and confirm continued accuracy improvements during the project.

In one embodiment, the Voisus product line of applications provides the underlying communication capabilities for this solution. A Voisus module or server acts as part of an embedded communications platform in the simulation environment providing intercom and radio capabilities to all students in the training system. Students wear USB headsets as a user interface that plugs into a computer-based device such as a Windows or Linux PCs. A variety of user interfaces are available with this product line, from physically realistic hardware radio panel devices, to small footprint software interfaces for Windows and Linux PCs, and web-browser based interfaces. In this embodiment, the Construct application runs on a Voisus server platform and provides ASR and TTS capabilities. The ASR and TTS capabilities embedded in Construct are adaptable to a variety of training applications, including close air support, call for fire, and air traffic control. With Construct, each synthetic entity is able to listen and transmit on its own simulated radio, with phraseology and behaviors that closely match real world operations. A modular, plugin based architecture supports adaptation for new applications. Using phraseology data collected in the simulation dataset, the Voisus products may be configured to create a customized speech recognition language model that transcribes UAS radio calls. The language model may have natural language understanding capability and, hence, is able to accurately transcribe even highly variable student speech. The system may prioritize the phraseology to recognize the most used and most important communications. Collected radio call transcripts and recordings (from the training system itself, other simulator/trainers, and real world operations, as available) may be used to determine the performance level of the speech recognition system and confirm continued accuracy improvements. The speech recognition systems may also be used to extract information and meaning from the speech transcripts.

Natural Language Understanding (NLU) and Generation (NLG) Modules.

Referring to FIG. 1, the NLU module 156A converts the automated speech recognition output into representations that are communicated and used by (1) the interaction manager module 158, which decides on the next action to take in the scenario, and (2) the measurement environment 180A, which assesses the correctness of student utterances. The communicative requirements of the synthetic entities 150 may span the range of highly structured communication to relatively unstructured communication. The NLG module 156B utilizes information such as action and state information from the interaction manager to select and provides the particular dialog and communication to be presented to the student with the TTS module 155.

One challenge of understanding the communications made within the simulation environment is the high likelihood of speech recognition errors. When the training of the student is low, the variation between student's speech is likely to be greater, posing a challenge for the speech recognition system. Moreover, the more unstructured the communications, the greater the chance that the speech recognizer's language model will falter, increasing the speech recognition error rate. To handle the range of communications in typical scenarios and inevitable speech recognition errors, the NLU module 156A does not rely on spotting keywords or extracting specific phrases. Instead, NLU module 156A may take a layered approach that leverages linguistic patterns, supervised machine learning, and deeper linguistic analysis as necessary.

In one example embodiment, a pattern-matching platform may be used for text analytics with the NLU module. The pattern-matching platform may integrate natural language processing components for collecting, processing, and analyzing text data for a variety of domains, including performance assessment, social analytics, and intelligence analysis. In some embodiments, the pattern-matching platform may provide tools for both intelligent dialog agents and communications analysis. The pattern-matching platform may have dialog agent modules that integrate rule-based and supervised machine learning approaches to natural language understanding and dialog management. The pattern-matching platform may have communications analysis modules to assess the performance of individual students, teamwork, and multi-team systems. The pattern-matching platform may provide content analysis—what operators discuss and how they discuss it—as well as structural analysis communication networks and their dynamics.

For simple student utterances, pattern-based information extraction techniques are sufficient. The NLU module decides whether a student utterance can be handled by domain-specific pattern templates with high confidence or requires further analysis. The NLU module performs a surface analysis of the utterance, filtering by features that might indicate a simple utterance, and performs dialog act recognition.

For more complex utterances and to account for speech recognition errors, the system may employ machine-learning based text classification methods to augment the understanding pipeline. As needed, for more complex or unstructured utterances, the NLU module can invoke deeper syntactic and semantic analysis.

Specific to one embodiment, Table 1 shown in FIG. 9 depicts some examples of the complexity of increasingly unstructured communications by the UAS operator role that the system should adequately comprehend, focusing on air-to-air communications between the UAS operator and a manned helicopter pilot. For example, acknowledgements of utterances (e.g., commands) are generally straightforward to understand as they repeat the syntactic and semantic structure of the manned aircraft synthetic entity's utterance. This makes it easier to classify the utterances and extract the necessary information for understanding with high precision.

Accurate comprehension of another utterance type, such as SPOT reports, is somewhat more challenging, however. First, the system must segment and classify the utterances accurately. For example, in the example of item 3 in Table 1 of FIG. 9, the description of the building under surveillance spans two sentences, requiring cross-sentence information integration. Second, there is some leeway for linguistic variation in how each aspect of a SPOT report is reported, requiring an understanding system with greater coverage of the linguistic devices for encoding semantic content for the domain. In still other situations, communication between the UAS and manned aircraft can become relatively unstructured, making understanding (and responding) significantly more challenging. For example, in item 4 of the table, the UAS asks a question of the manned aircraft pilot. Enabling the NLG system to respond to questions requires accurately grasping the focus of the question—often requiring grounding of phrases with objects in the environment, as here—and crafting a sufficient response.

Text to Speech (TTS) Module.

Referring to FIG. 1, the TTS module 155 provides a speech response to the student based on the input provided from the user interface 120 and the results from the interaction manager 158 given the analysis of the response from the ASR module 154 and the NLU module 156A. The NLG module 156B typically provides the input to be used by the TTS module 155 to communicate an event to the student.

To predefine and develop appropriate communications responses from synthetic entities, the responses may be defined from a communication plan. For example, for UAS training environments the communication plan may include relevant radio nets such as team internal nets (frequencies) and so on expected for that environment. The TTS responses may be customized with pronunciations for the specific geography and waypoint names, call signs, and other terminology to ensure quality speech is heard by the student. The TTS module may customize communication sound effects including crypto and background sounds mixed into communication transmissions, as appropriate, to create realistic synthetic communication transmissions. Speech templates may be predefined for radio requests, responses, and acknowledgements from external assets in order to simplify natural language generation. These templates may be parameterized for variables like headings, altitudes, and waypoint names to be insert into the generated speech on the fly.

Interaction Manager Module.

Referring to FIG. 1, the interaction manager module 158, also called the interaction manager, is a module that generally provides the intelligence of the synthetic entity 150 and the communication training system 100. The interaction manager module 158 takes the input from the communication platform 152 (text data representing the response of the student), determines the progression of the state of the student and the simulation based on the response provided by the student as compared to predefined state transitions and determines what action should next be presented to the student.

To maintain the state of the student's interaction with the scenario, the interaction manager module 158 represents the student interaction context, including both spoken interaction and actions in the simulation. In some embodiments, maintaining state about spoken interaction requires a history of the utterances so far, from both student and synthetic entities. And a corresponding action history represents the progress of the student in carrying out the mission. The interaction manager may also have knowledge of the mission and the individual tasks required to complete the mission.

The interaction manager module 158 decides on a next action in the simulation, given the state of the interaction and the pedagogical goals of the scenario. The action can be a spoken interaction and/or a simulated physical action carried out via one of the scenario's synthetic entities. If the action is a verbal response, the interaction manager selects and provides a template for the response the NLG module. The NLG module combines the interaction manager module's selected action and information from the current state representation to craft a response to the human user. The result of this action is a new interaction state.

To perform its functions, the main submodules of the interaction manager module 158 span the maintenance of state and action selection: (1) interaction context and (2) framework for action selection. The interaction context integrates information from the "world state" of the simulation with information about the spoken interaction of the student and the synthetic entities. The interaction context submodule will track the entities and events mentioned in the training scenario so far, and maintain a history of the spoken interaction, including the syntactic and semantic structure of each student utterance. The interaction context submodule is also responsible for directly tracking discourse obligations, such as the need to respond to a question from the student. The framework for action selection operates over the interaction state representation. To ensure that the interaction manager's action selection meets the requirements for interactivity that produce the desired training outcomes, several possibilities for decision-making frameworks may be used. One approach is a finite-state automaton-based algorithm, in which interaction states are mapped to actions in the scenario. While easy to implement, finite-state approaches have limited capacity to express the state of the interaction and possible actions based on these states. For moderately complex interaction scenarios, a richer representation of state is typically required. Action selection over such state representations can take the form of update rules over the state, based on a general or specific policy for action-taking. In some embodiments, the decision-making algorithm is a state-machine with state machine tables. Errors in speech recognition and language understanding may introduce significant uncertainty into the student's inputs. Hence, to account for uncertainty methods for interaction management based on statistical machine learning may also be used.

Performance Data.

Figure 7C:
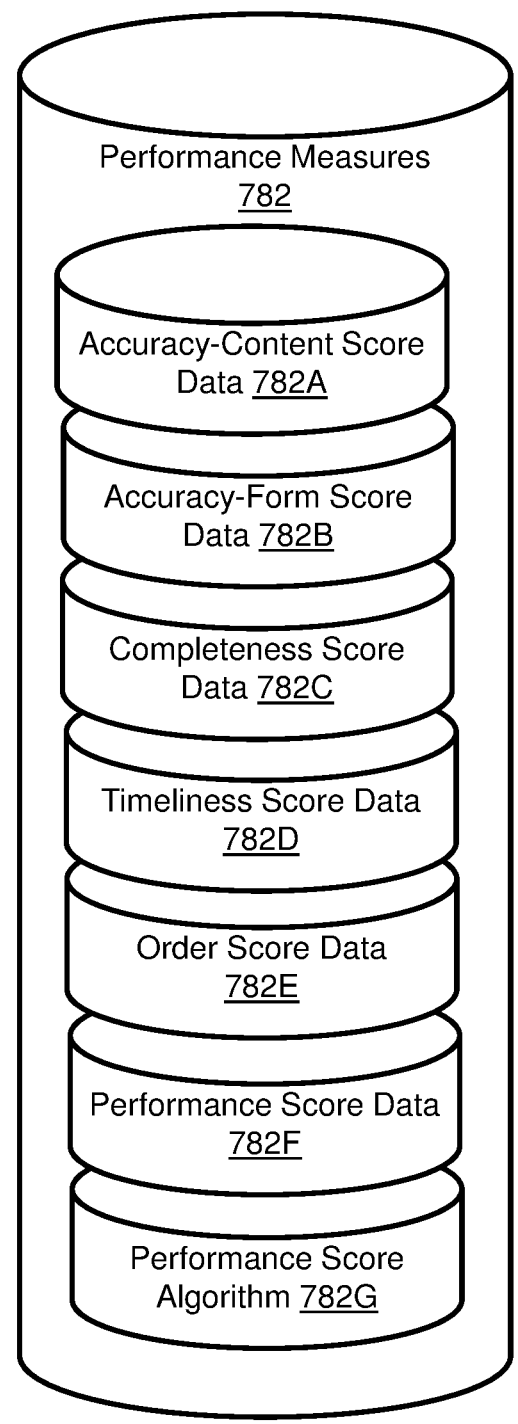
FIG. 7C illustrates one example of the different data components of performance measures.
Figure 7D:
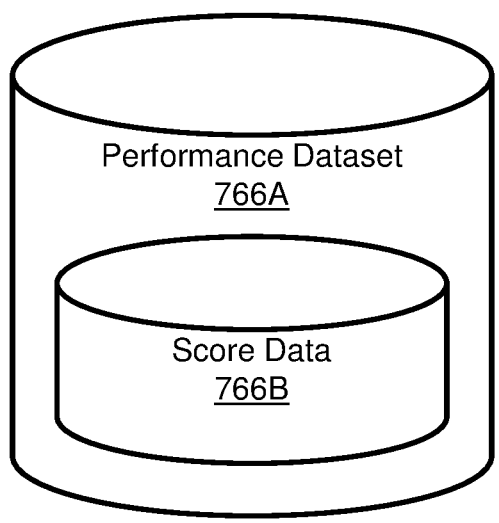
FIG. 7D illustrates one example of the different data components of performance dataset.

Referring to FIG. 1, the performance dataset 166 generally comprises the response data of the student, such as text utterance data of the student, formatted in the expected forms for each training event. The performance data 166 may also include other meta-data associated with the response such as the time of the presentation of the training event to the student and the time the student provided their response. In one embodiment, the text data these are bundled into JSON objects. As shown in FIG. 7D, the performance dataset may also comprise score data of the student to the training events.

Measurement Environment.

Referring to FIG. 1, the measurement environment 108B provides an assessment of student performance using data from the other system components as well as measures developed specifically for the communications training system. The measurement environment 180B generally provides this assessment using a performance assessment module (PM Engine) 184. The measurement environment 180B may also comprise other components: a performance feedback module (Performance Dashboard) 186 and an access application module 162 to store and access measurement environment information (A-Measure Server Application or ASA) such as information in a performance measure database 182. Integration of the measurement environment 180B components enhance the performance assessment module 184 and performance feedback module 186 capabilities of the communications training system training environment 110 by integrating the relevant human performance measures for use by both synthetic entities 150 and performance feedback modules 186. The measurement environment 180B may be distributed from the training environment 110 and in communication via a proxy such as the PM Engine proxy 164 as shown. In some embodiments these features may reside locally in the training environment shown here as measurement environment 180A.

Figure 3B:
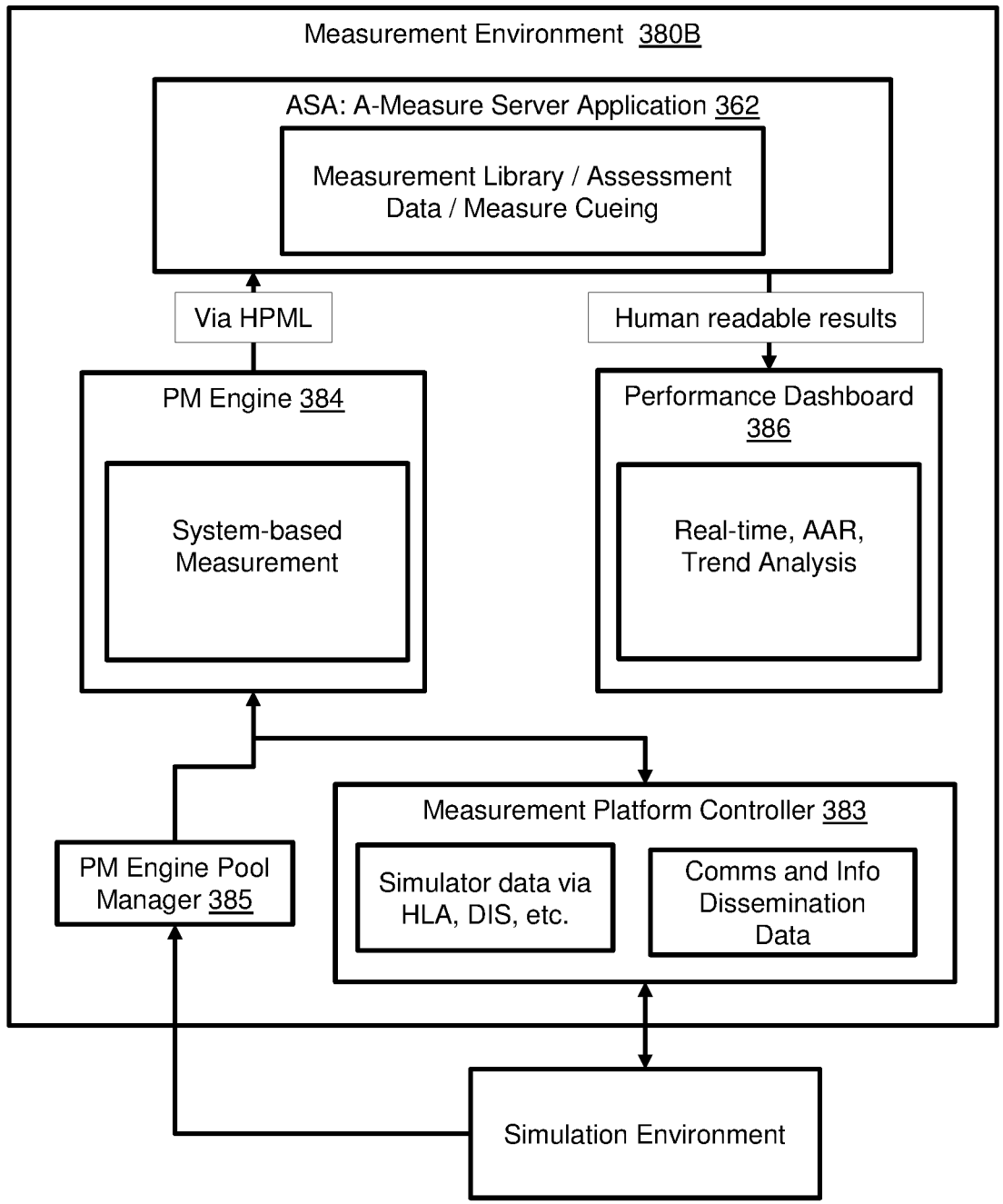
FIG. 3B illustrates a notional architecture for a an example embodiment of a measurement environment.

One embodiment of a measurement environment is shown in more detail in FIG. 3B. This measurement environment 380B comprises the measurement platform controller, the PM Engine pool manager 385, the performance dashboard module 386, the PM Engine 384, and the ASA 362. In this embodiment, the ASA 362 includes the performance measures database. The performance dashboard module 386 generates scorecard and AAR displays for viewing visualizations of the performance data collected and processed by PM Engine 384 and stored within the ASA 362. These displays may be dynamically generated using the configuration information contained within the ASA 362. This includes information about the filters, data sources, and visualization the dashboard creator wants displayed in the user interface.

The Performance Assessment (PM Engine and PME) and Access Application (A-Measure Server Application (ASA)) Modules.

Referring to measurement environment 180B of FIG. 1, the performance assessment module 184 serves as the data analysis component of the measurement environment 180B. Also called the PM Engine, this performance assessment module 184 is an analysis tool that can query, filter and perform calculations on any type of data. The performance assessment module 184 calculates event and performance measures and assesses measures from the event data generated during the execution of the simulation and serves as the data analysis component of the measurement environment 180B. The performance assessment module 184 performs the comparison, or alignment of event data from the simulation environment 140 with performance measurement data 182 to score the training event response data as compared to expected event response data. In some embodiments, the performance assessment module 184 uses Human Performance Markup Language (HPML) to handle data from a variety of sources, such as a distributed simulation network (e.g., HLA or DIS), log files, and Aptima's SPOTLITE™. More specifically, the performance assessment module 184 processes instructions defined in HPML; connects to simulations, physiological devices, mobile devices and/or other data sources; subscribes to the necessary data streams in the training environment; uses that data to measure and assess performance; and outputs the resulting measurement and assessment data in real-time. The performance assessment module may be configured with a plug-in interface that allows it to integrate with many different data sources and measurement result repositories for increased flexibility in the calculation and distribution of performance data.

For the communications training system, the performance assessment module processes event and performance data consistent with SPOT, CCA, BDA, IF and THO Report events and calculates corresponding event scores and performance measures. The performance assessment module may also assess event data on different dimensions including accuracy, completeness, order, brevity and timeliness and duration. Scores and measures may be assessed on any type of rating scale and in some embodiments the rating scale is a three tier discrete stoplight rating scale (e.g., red, green and yellow).

The access application module 162, also called the A-Measure Server Application (ASA), is an application for storage, retrieval, management, and analysis of performance measurement data from the performance measures database 182. It is comprised of an application providing access to a relational database storing performance measurement data and a set of RESTful services which allow for the interaction with that RESTful data. The ASA may also use the HPML format to define performance measures, as well as to describe human performance from a variety of sources, including PM Engine™ and SPOTLITE™

The performance measures database may be hosted using an SQL Server and use Entity Framework as the ORM tool providing the data model. Web services which require user authentication are used to store and retrieve data with the ASA. Data stored through the ASA is used to drive both real-time and AAR web based performance dashboards.

Interfaces support communication between existing training environment components and both the PM Engine and ASA to provide performance assessment capabilities of the training system. This is provided by an integration layer between the PM Engine and the training environment. This integration layer serves two primary purposes: it allows the simulator and communications data to be consumed by the PM Engine; and it allows the performance measurement results produced by the PM Engine to be made available to the training environment for consumption by synthetic entities or other modules.

The integration layer may be composed of a PM Engine proxy for the training environment and a connecter plug-in for the PM Engine. The PM Engine proxy may be a module within the training environment that provides communication with the performance dataset, including the simulator and communications data necessary for performance assessment, to the PM Engine and receives the performance assessment/measurement data produced by the PM Engine. The connector plug-in for the PM Engine will both consume the simulator and communications data provided by the PM Engine proxy, and publish measure results back to the PM Engine proxy.

The ASA may also be integrated into the training environment through a local measurement environment. The ASA is used to collect and store performance data during simulation runtime and subsequently serve as the performance data to the performance feedback module. The ASA may enable the performance feedback module to work off of performance data stored in the ASA via the RESTful service APIs that it exposes.

Performance Measures.

Performance measures are data used to collectively assess both the behaviors and communications of the student. The performance measure may be provided in real time and may be implemented in HPML. The performance measures can be used both to populate the AAR and to provide the foundation for performance based adaptation of the simulation environment.

Human Performance Markup Language (HPML) is an XML-Schema-based language intended to cover all meaningful aspects of human performance measurement in various training and operational environments. The HPML hierarchy enables the representation of both generic concepts (e.g., measurements and assessments) and mission specific concepts (e.g., instances of measurements and instances of assessments) necessary for capturing the experiences associated with human performance and human behavior. Specifically, it is an XML based language designed to express performance measurement concepts in a format that is both machine and human readable. It enables the explicit combination and transformation of performance data into performance measurements and assessments. This allows measures to be constructed independent of any specific training or operational system. At a basic level, the performance measurement instructions defined in HPML can be used to specify the system data elements to be collected, the calculations to use to process the data, and when to produce performance measurement results.

At a high level, HPML is broken up into many different sub schemas that represent the different parts of the overall HPML schema. Each part of the schema has different dependencies that work together to calculate measures and assessments on a given data source. The schema is separated into six distinct groups, 1) HPML, 2) Computation, 3) Results, 4) Assessments, 5) Measures, and 6) Instances and Periods. These groups make up the core components of HPML and can be added to or expanded with additional links in the schemas. Each group is described in more detail below:

- HPML: The HPML group refers to shared and top level elements (e.g., MeasureDefinition element) and attributes that all the other schemas must reference. This schema organizes all sub schemas that make up the standard HPML Core.
- Computation: The Computation group refers to the schemas that represent the algorithms, triggers, and other computational components of HPML. These components can be combined with both the
- Measures: The Measures group refers to schemas representing the linking of data sources and computation to produce measurement outputs from a given data source.
- Assessments: The Assessments group refers to schemas representing the assessment of a given measurement's values either by category (Expert, Novice, etc.) or Value (100%, 99%, 75%, 10.3, etc.).
- Results: The Results group refers to schemas representing the output of both measures and assessments, detailing the information produced by specific measure points throughout an entire measurement period.
- Instances and Periods: The Instances and Periods group refers to schemas representing the creation and use of measures and assessments for a given context. This schema defines the instantiation of HPML elements at specific points in time, or specific locations within space. Every element in this schema has a time and/or location component. Whether that time is very short or spans several years, whether the location is a small area or a line on a map, the schema refers to when and where data should be computed so that measures and results can be linked to specific places and times. While the segregation of HPML into multiple separate, but dependent, schemas may produce an added level of complexity, ultimately, it provides the language with the added benefit of extensibility, which is critical in the ever changing technological landscape of training environments. The modularity of HPML's design allows for the replacement of sub-schemas with new additions while still maintaining the core capability. Under this design, a developer could extend the schema to allow for more functionality, or to test new components for a specific context, while keeping the base schema intact.

A full description of the HPML schema can be found in the HPML User Guide posted to the HPML SISO Study Group. The User Guide includes descriptions of elements of the schemas (e.g., definitions of what the elements and attributes mean) as well as example measures utilizing these schemas.

For example and not for limitation, assume you are trying to measure aircraft performance in staying below a coordinating altitude (i.e., altitude the aircraft cannot enter). Table 2 of FIG. 10 shows an example of a simple performance measure implemented in HPML. The DataRequest identifies the object and its specific attributes that are required as input to a measurement. In this case, the DataRequest is requesting the X, Y and Z components of the WorldLocation attribute of the Aircraft, which has an Id equal to a value that will be supplied later as a parameter. The MeasurementTemplate in our example uses the WorldLocation attribute of the Aircraft object to determine if the aircraft is currently above a prescribed altitude. The maximum altitude in this measure is defined as a constantValue of 4000 ft. in the MeasurementTemplate. A Parameter is also passed into the MeasurementTemplate, informing the measure for which specific Aircraft to retrieve the Altitude. The use of a Parameter here allows the MeasurementTemplate to be reused for different aircraft. At the core of the MeasurementTemplate are two nested MeasurementComputations. The inner-most computation takes the DataRequest (WorldLocation.X,Y,Z) as an operator and uses a customized function library to compute the Altitude. The result of this computation is then used as an operand for the outer MeasurementComputation, which compares the altitude value to a ConstantRef that points to the maximum altitude ConstantValue and determines if the aircraft's altitude is greater than the prescribed maximum altitude. The MeasurementDefinition finalizes the specification contained within the MeasurementTemplate. More specifically, the MeasurementDefinition defines any parameters that have been exposed, in this case the marking identifier of the aircraft.

The example shown in Table 2 of FIG. 10 illustrates the basics of HMPL. Performance measures may be vastly more sophisticated and to include many other elements such as assessment layers, training objectives and relevant contextual information. Once expressed in HPML the performance measures will be available for use within the PM Engine. At simulation runtime, the HPML will be interpreted by the PM Engine. Based on the information defined in HPML, the PM Engine will connect to the required data sources, subscribe to the necessary data, use that data to calculate performance measures and performance assessments and finally output the resulting performance measurement and assessment data.

For embodiments for UAS students, feedback to the student may be based on a set of carefully constructed performance measures. While the discipline of the tactical environment will continue to limit the student's vocabulary, the ability to use speech and natural language will replicate real world mission environments and greatly enhance the student's learning through interaction with the tactical training system. The performance measures may be defined so that they provide the student with the information required for them to learn. This means that the definitions will be extended to include supporting measures, relevant contextual information, assessment criteria and other information necessary for the student to self-learn.

Utterance Scoring.

In some embodiment, the communication training system is configured to assess or score utterances of the student. Embodiments of this system utilizes as scoring mechanism that relies on the notion of slot alignment to align subsequences of words in the utterances of the student with exemplars of legal utterances based on each set of simulated test scenarios. The employed algorithm is a subset of the approach developed by Sultan et al. A classification of each of the student's utterances is then used to score the utterances and generate appropriate feedback for training purposes.

The communication training system allows students to practice formation of proper communications for a variety of structured report types as training events including SPOT, Battle Damage Assessment, Remote Hellfire, Call for Fire, Target Handover, and Close Air Support reports.

Each report or utterance type is composed of structured utterances which can be decomposed into phrases, or slots. In some cases, the phrases can be further decomposed into smaller semantic units, e.g. a number or count followed by a description of targets. Since we know the details of each simulated scenario a priori, we know what the student ought to be reporting. That is, we are afforded a very restricted domain of appropriate utterances from the communication training system. This makes it possible to enumerate a set of expected utterances or exemplar phrases and semantic units for which the student should strive. Furthermore, we can classify the expected utterances into subsets where some phrases are more desirable than others. Using this partitioning of phrases, we can apply a scoring mechanism that compares the phrases of the student's utterance to the subsets of expected utterances, allowing for some phrases of the utterance to be preferred over others and generating a proportional score. The sets of expected utterances can be classified in such a way that each subset of phrases has a similar deficiency, if a deficiency exists. This classification scheme can be exploited to generate constructive feedback when deficiencies in the student's utterance are encountered, e.g. the student should not refer to the target as "a group of guys", but instead use more precise and informative language like "five individuals".

Each simulated campaign mission is composed of training events with simulated data presented to the student. The student is supposed to observe the training event simulation data and respond with the appropriate utterance corresponding to the correct type of utterance report(s) for the event. The information in the utterances has a structured form. For example, a well formed utterance for the SPOT report includes descriptive observations along with the position and time of the observations. FIG. 11A shows the information present in a well formed utterance for each of the report types. We refer to each of these elements of the utterance as a slot.

Each utterance's slot in FIG. 11A contains specific kinds of information that should have a reasonably structured form. Some slots have more degrees of freedom in their expression than others. For example, the target location has a precise, standardized format which relays information about the coordinates of the target; whereas target description with counts can be formulated and uttered in many equally correct ways, and therefore requires a more sophisticated natural language processing technique for assessment.

Subject matter experts (SME) may be used to predefine the common, anticipated slot phrases that a student may utter under the circumstances presented in each of the simulated events. The SME may group the phrases into classes where some classes of phrases are more desirable than others, i.e. the student should receive a higher score for uttering phrases in some classes than in other suboptimal classes. One of the classes should be reserved for optimal phrases, i.e. there should be a class of phrases that the student should be striving for and receives the maximum score for uttering a phrase from this class. Each of the other classes may be grouped such that the phrases in that class have a common deficiency that make those phrases suboptimal, e.g. the student used less formal or descriptive language to describe the target such as "a group of guys" instead of "five individuals". Additionally, the classification system can be applied at any level of resolution that is needed to sufficiently express the ranking of phrases. In other words, this system affords the definition of as many classes as are necessary to properly rank the phrases under the simulated event to which is pertains.

Note that the target description with count slot is common to all of the report types. As the name suggests, this can be decomposed into sub-phrases. For example, the utterance, "five individuals carrying RPGs", can be decomposed into a count of "five", a target description of "individuals", and a description of the activity they are engaged in, "carrying RPGs". Decomposing the target description with count slot in this way allows the enumeration of phrases by the SME to be simplified by enumerating the legal count/number phrases, target description phrases, and activities phrases separately, reducing the slot to phrases that can be more easily enumerated independently. FIG. 11B shows a fabricated example of this decomposition for illustrative purposes.

The SME's lists of common phrases with their classifications are encoded in a spreadsheet. The communication training system simulation software is designed to directly read the spreadsheet. This allows the SME and trainers to work with a human readable format that the simulation software can interpret to employ the rest of the scoring algorithm based on the encoded information. Most importantly, this allows alterations or additions to easily be made to the legal phrases and classification system at any time, including after system delivery via text file updates.

Each training event in the communication training system has corresponding utterance types that should be uttered by the student. Each training event's utterance type has an associated list of slot phrases as defined by the SME. The goal of slot alignment is to find the SME's slot phrase that most closely fits the student's actual utterance. This is accomplished through text alignment.

Text Alignment for Scoring Utterances.

Generally speaking, text alignment is the task of identifying textual segments in different sources of text that have similar semantic meaning. It is an important topic to many fields within natural language processing including automatic machine translation, information retrieval, question answering, and many others.

Text alignment is applied to a pair of phrases or utterances from a slot where one of the phrases is the student's utterance for that slot and the other is an entry in the SME's list of expected utterance. There is a preliminary step performed before the main alignment algorithm is applied. The location of stop words is identified in both phrases. Stop-words are common words in a language that often hold little semantic value and are often present to inform the reader/listener of grammatical structure, e.g. the, a, of, etc. Other words, not in the stop-word list, are considered to be content words. These content words are assumed to hold the more semantic meaning, and are therefore more productive for the purpose of aligning phrases.

The core of the text alignment algorithm is designed to find the longest continual subsequences, i.e. n-grams, of the content words in the shorter phrase that map to or otherwise align with subsequences in the longer phrase. Since longer continual subsequences are preferred, the algorithm searches for matching n-grams where n is initially equal to the length of the shorter phrase, then n is reduced until either there are no more matches, n equals zero, or all content words have been accounted for. In this way, a set of content alignments is produced between the two phrases.

An alignment scoring algorithm is used to score each pair of aligned phrases. The scoring algorithm, which is the Sorensen-Dice Similarity Metric, is shown below:

$$Score_{alignment} = \frac{2|C|}{|A| + |B|}$$

Where |A| is the number of content words in one phrase, |B| is the number of content words in the other phrase, and |C| is the number of words that were aligned. Note that |C|=|A∩B| when there does not exist duplicate words in either phrase.

A text alignment score of the student's phrase is computed for each of the phrases in the predefined expected phrase list for the applicable slot. The predefined phrase with the highest score is selected as the best aligned phrase for the slot and is used in for utterance scoring and feedback generation.

Determining Utterance Score.

There is a weight associated with each of the predefined expected utterances, or utterance slot values, as shown in FIG. 11C. The weight numerically encodes the correctness or acceptability of the phrases being uttered in a given slot and is used in the scoring algorithm. In the embodiment shown, a higher weight means that the phrase is more correct than lower weights. Often, these weights are direct functions of the assigned class for the phrase, but the code is implemented in such a way that this does not necessarily need to be the case. That is, if it becomes convenient or necessary to customize the weights in the future, the code can be written to facilitate the changes to the spreadsheet.

An additional piece of information may be encoded in the slot's description column. Since each event within a campaign mission reflects a specific simulated training event which portrays a specific number of targets that the student is reporting on, we encode the correct number of targets for each description type. That is, if the description was persons and the simulated event has five people depicted, we encode that there are five people. We call the correct number of targets the constraint. This offers a way for the scoring and feedback modules to compare the student's numeric description to the actual number of specific types of targets in the simulated event. If the student says there are more persons, for example, than exist in the simulation, the score and feedback ought to reflect this mistake. Also, the number of targets can be independently defined for individual types of targets. So, for example, we can encode an event where there are five people and two tanks by constraining the people descriptions to five and the tank descriptions to two.

FIG. 11C shows examples of the weights and constraints. Note that FIG. 11C is the same as FIG. 11B but with the additional weight and constraint columns.

Scores are separately produced for two types of phrases. If the student uttered "five persons carrying RPGs", then the first scores phrases that are aligned to a number or count and aligned to a target, e.g. "five persons" where "five" was aligned to the number and "persons" was aligned to the target description. The second type of phrase is the aligned activity that the targets are performing, e.g. "carrying RPGs".

The score for the count and target is a function of the weights associated with the number and target description, the presence of the number and target, and the numeric constraint. The utterance of a correct cardinal number is directly rewarded, as specifying the definite number of targets in the simulator should be a goal of the student. The score for the count and target is shown below:

$$Score_{target} = \delta_{card} + \delta_{cont} + k_{descr} \cdot w_{descr})/k_{norm}$$

Where $\delta_{card}$ and $\delta_{cont}$ are indicator functions for the presence of a cardinal number and the case where the numeric constraint is not violated, respectively. $w_{descr}$ is the weight from FIG. 11C for the description, and $k_{descr}$ is a coefficient that determines the importance of the weight. $k_{norm}$ is a normalizing constant so that the score is linearly scaled between zero and one. In our case, $k_{descr}=2$, and $k_{norm}=1+1+k_{descr}=4$. The values of the coefficients can be changed as desired to assign more weighting to the description element.

The score for the activity portion is simply the associated weight assigned in FIG. 11C. That is:

$$Score_{activity} = w_{activity}$$

If multiple target or activity phrases are present in a student's utterance, the scores above for each are averaged to produce a combined score. That is:

$$Score_{multiple} = \frac{1}{N} \cdot \sum_{i=0}^{N} Score_i$$

These target and activity scoring methods are applied to all the appropriate report slots present in FIG. 11A.

Specific Event Measures and Performance Measures.

The set of performance measures may include the measurement and assessment of their communications as well as how their communications are coupled with their actions. This may include performance measures that assess the student's communications in the following ways: accuracy, completeness, timeliness, brevity, and order of individual communications; and appropriate coupling of communications to student actions in the simulation. To support these different types of measures, as illustrated in FIG. 7C, the performance measures 782 may comprise accuracy-content score data 782A, accuracy-form score data 782B, completeness score data 782C, timeliness score data 782D, order score data 782E, performance score data 782F and performance score algorithms 782G. Measurement of these dimensions takes into account the content and form of student utterances, as well as contextual information from the simulation environment. For example, accuracy of a description in a SPOT report is relative to a known entity or event in the scenario captured from the simulation environment, and timeliness is measured with respect to the event onset in simulation runtime.

Accuracy of communication encompasses both the content and form of a piece of student communication. That is, the system may decide: (1) whether a student's utterance expresses the content that is required at a given point in the scenario, and (2) whether the utterance meets the relevant protocols for military communication in this environment. To evaluate content accuracy, the system compares expected utterances defined in the accuracy score data to observed student responses in terms of semantic overlap. Did the student accurately describe and report the event in the scenario? Student utterances must match one of a set of predefined possible lexical formulations for the event. Moreover, specificity counts: for example, "red truck" is likely preferred to simply "truck". Distinctions such as these are reflected in the accuracy score. The expected content will be a representation of an optimal utterance at that point in the scenario. To compute semantic overlap, the system can make use of one or more semantic resources for determining semantic fit. For example, as described herein, one approach is to compute lexical overlap between the expected and observed utterances for each "slot" in the expected utterance template for the utterance type. This will permit variation in student utterances such as synonyms and paraphrases of the expected utterances (associating a cost with such variation, if desired). The variation in expression will be predefined in the performance measures.

Evaluation of form is based on the evaluation of the content. In particular, evaluating form benefits from the correct identification of a part of an utterance as expressing a particular kind of content and applying form-based criteria to that part of the utterance. As with content analysis, the requirements for form may be derived from available communications protocol, working with consultants, and/or analyzing available data of training interactions. For example, given the variation of expression for form and content, in one embodiment an accuracy event measure may be determined by aligning the utterance of the student with one or more of the utterance slots for the event type whereby an utterance slot score can be determined. The utterance slot score may be determined by a predefined score or other classification associated with the predefined utterance term or phrase that aligns with the utterance of the student in that slot. An accuracy event measure for the event type can be determined from the one or more utterance slot score such as by summing all of the utterance slot scores for that event type.

Completeness measures the degree to which the student expresses all of the required items of information. This is measured principally by whether the utterance fills all appropriate slots in the expected utterance template for the event type. Did the student report all required information for the event? The completeness score data includes the utterance template that predefines the type, slots, phrases, scores and other data associated with the completeness event measure. Within the template, utterances are parsed into slots of required information with respect to communication type. For example, for a SPOT report as an event type, slots include (1) number, (2) description, (3) activity, (4) location, (5) time, and (6) "what I'm doing". Completeness may be computed as the percentage of slots filled by the student. For example, in one embodiment, the completeness event measure is determined by the method of aligning the utterance of the student with the one or more utterance slot, determining whether the utterance slot is filled or not filled by the utterance of the student, and determining the completeness event measure as a percentage of the one or more utterance slot of the event type filled by the utterance of the student.

Timeliness is assessed by considering how the student made proper use of the time that they had to communicate the message, and if it was communicated at the right time within the context of the mission. The timeliness score data includes the utterance template that predefines the type, slots, phrases, scores and other data associated with the timeliness event measure. Note that timeliness does not always equate to fast, since it is important that the student understand the urgency related to each communication and makes good use of the time afforded to them so that they can form accurate and complete communications. Did the student report the event in a timely manner according to protocol? Timeliness is defined as the speed that a communication is formulated and transmitted relative to event observation in the scenario. For example, in one embodiment, a timeliness event measure may be determined by defining an utterance response time as the time between the presentation of the simulation data to the student and the receipt of the response data and comparing that to expected utterance response times. Each of the event types may have one or more expected utterance response times aligned to a response time score and when the student's utterance response time is aligned with an expected utterance response time the corresponding response time score defines the timeliness event measure.

Evaluating order is based on protocol for the sequencing of particular dialog acts. This measure draws on the spoken interaction history of the interaction manager and the NLP module's classification of utterances into expected dialog acts. The communications analysis module computes how closely the ordering of information fits the optimal, prescribed ordering (weighting the evaluation of performance by distance to the protocol-based ordering, if desired). Did the order in which a student reported the event match protocol? Most communication types must follow a structured format where the order of slots of information is prescribed. The order score data includes the utterance template that predefines the type, slots, phrases, scores, order and other data associated with the order event measure. For example, in one embodiment, an order event measure is determined by aligning the utterance of the student with the one or more utterance slot and comparing the response data order to the expected utterance slot order to determine the order event measure. The expected utterance slot order may be predefined for the utterance type and the utterance of the student defines a response data order reflecting the order of utterances of the student in their response. The order may be computed as the distance in terms of "edits" (re-arrangement of a pair of slots) from the prescribed order.

A brevity event measure reflects whether the student reported the event concisely? Brevity can be operationalized in several ways. First, brevity may refer to the student's use of "brevity codes" at the appropriate times. The brevity score data includes the utterance template that predefines the type, slots, phrases, scores and other data associated with the brevity event measure. For example, in one embodiment, the utterance slot defines one or more brevity terms and the utterance of the student is aligned with the utterance slot and the brevity term with it corresponding brevity score to determine one or more utterance slot brevity score as the brevity event measure. If there are more than one slots for that event type, the brevity scores for each utterance slot can be summed to determine the brevity event measure.

A brevity event measure may also be operationalized as the speed or rate of transmission of the student's communication. For example, in one embodiment, a time may be measured from the start of the utterance of the student and the completion of the utterance as the utterance duration of the student. Each event type may have one or more predefined expected utterance durations with each of these corresponding to a brevity score. The utterance duration of the student may be aligned with the expected utterance duration and the corresponding brevity score as the brevity event measure.

Aa brevity event measure may also be operationalized as the "density" of information conveyed-capture an intuitive notion of conciseness. For example, in one embodiment, a total number of words in the utterance of the student may be counted. Each event type may have one or more predefined expected word counts with each of these counts corresponding to a brevity score. The word count of the student may be aligned with the expected word count and the corresponding brevity score as the brevity event measure.

Mission Performance Scoring.

In some embodiments, a scoring method is utilized to align and score utterances from student reports to determine a performance score and to provide feedback to the student. The scoring framework generally "bins" performance measure scores such as event scores and then aggregates them into scores for aligning with training events, missions, and simulation-related points earned (toward "rank" promotion) as well as for aligning with the execution data (e.g., state machine inputs).

For each performance measure type (i.e., result), measure triggers (i.e., when a measure should be calculated), measure components (e.g., objects, attributes), and calculations to be performed on components to produce the performance measure. In some embodiments, measures may be binary (pass/fail) or stoplight (excellent/acceptable/deficient).

In one example embodiment, a performance scoring algorithm is defined for each performance measure type as follows. For example, every performance measure type may get a green/yellow/red assessment (bin), for which performance thresholds (e.g., high/excellence=>X, med/acceptable=X, low/deficient/needing improvement=<X) are identified. The thresholds for each performance measure type are defined in a performance measure type template, tailored for missions, as needed. Aggregating green/yellow/red measure scores at each level requires setting a "passing" threshold (e.g., what % of possible score is passing?), and determining whether weights (priority) should be applied to any scores.

The use of stoplight scoring at each level requires a performance measure type to be defined as either pass/fail (Green/Red) OR Green/Yellow/Red. For stoplight scoring, each training event must be pass/fail (Green/Red) and every Mission is pass/fail only. Rank is advanced minimally for non-failing mission play. Increasing amounts of expert performance over time are required for higher ranks.

Determining the performance scoring algorithm for TEs involves an aggregation of behavioral and communications measures. Performance measure type bin scores are added together. The highest possible score is calculated, given the number of performance measure types (and any weights) selected for that TE. If a particular performance measure type is clearly higher-stakes than the others for that mission, weighting may be applied. A pass/fail (green/red) threshold is defined for each training event template (i.e., what % of possible score is a "passing" %), and a pass/fail score is calculated for each training event attempt based on that threshold.

The performance scoring algorithm for Missions (aggregation of training events) involves adding together the various training event scores for that mission. Weighting is only used if the training event is new to the student—that's when the training event matters most (best opportunity for developmental feedback). A pass/fail threshold is defined for each Mission (or across missions) using one of the following options:

Option 1: Certain number of training event attempts passed for this mission (e.g., requires 4 of 6 TEs to pass this mission)

Option 2: What % of training event points is required for "passing" a mission? (i.e., similar percentage-style calculation with threshold as used in training event scoring)

Additionally, the system may apply a strategy for earning Career/Rank points (+points for good performance,—points for bad performance). These points may be used to determine Rank promotion criteria.

Performance Feedback Module (After Action Report (AAR)).

Performance feedback capability of the communications training system may be provided to include diagnostic performance assessments, including measures of communication. Feedback to the learner is an important part of an effective training experience. In some embodiments, the communications training system supports feedback during task execution and in a final outbrief to the student. The performance feedback module may display assessments for both the individual tasks as well as an overall assessment of key training objectives throughout the training. The performance feedback module may provide a presentation to the student indicating areas of improvement that can be made in his or her performance with respect to timeliness, completeness, and communications discipline. The performance feedback module may indicate to the student ways in which specific scout and reconnaissance skills could be improved via tactical communications with specific units and entities such as the TOC and selected aviation units. In order to present a complete performance feedback, the training environment may capture voice transmissions from the student, translate voice to text, time stamp communications and correlate voice transmissions to action within the simulation.

The training environment performance feedback infrastructure may also support display and review of newly available data derived from the PM Engine and access application module. This data may include both conversational transcripts as well as metadata regarding the conversation (e.g., any failure modes that came about as a result of ASR failures, terminated conversations, etc.). In addition, the performance feedback module may incorporate display and review of measures of performance calculated by the PM Engine and access application module alongside the measures calculated by the training environment system.

Feedback Generation.

The measurement environment is able to generate feedback on the student's utterances that may be specific to each event, report type, and slot. In the previous sections, the student's utterances were decomposed and aligned with phrases in the SME's predefined legal phrase (utterance) lists. Each phrase in the list had an associated class. The classes can be used to group phrases together such that each class of phrases has common deficiencies. Messages can be defined such that when a phrase with a certain deficiency is encountered, as defined by its class, an appropriate feedback message is displayed to the student informing them of the deficiency. The contents of the feedback message can be defined in concert with the definition of the classes. This affords the ability to alter or tailor the feedback messages in the future by forming new classes and constructing appropriate messages that pertain to the simulated event that the student is practicing.

In addition to using the classes to provide feedback, other types of feedback may be generated. For example, in the number and target portion of a slot, the numeric constraint can be used to generate feedback if the student mentioned more targets than exist in the simulated event. Also, the absence of phrases can trigger feedback informing the student of the missing information. In other words, if either $\delta_{card}$ or $\delta_{cont}$ are equal to zero during the utterance scoring, feedback can be generated to inform the student that they should use cardinal numbers to specify the number of targets or that they have specified more targets than exist in the simulated event.

The performance feedback module is implemented by producing a list of features while a slot is being analyzed in the utterance scoring section of the code. Features essentially indicate properties of a phrase that may elicit feedback, such as the student exceeded the numeric constraint or a portion of the phrase is missing. Combining the features with the classes of aligned phrases provides a structured way to select appropriate and constructive feedback to the student. FIG. 11D shows an example of features, classes, and the corresponding feedback message, and is intended to work with the information defined in FIG. 11C.

Note that in FIG. 11D, an artificial class of zero was introduced to indicate the absence of that information from the utterance. Also, feedback messages of N/A indicate that there was no deficiency with this feature and therefore, no constructive feedback is necessary. As an example, if the student uttered, "five persons carrying RPGs", the phrase would be decomposed into a target count of "five", a target description of "persons", and an activity of "carrying RPGs". The student has uttered all relevant portions, the number is the correct cardinal number according to the constraint, and each portion belongs to class 1 which in this case corresponds to generating no feedback. But if the student instead uttered, "Guys looking suspicious", they are missing the number of targets and they used a class 3 target description and activity. This would trigger a NoNumber feature, a class 3 DescriptionClass feature, and a class 3 ActivityClass, which in turn generates the feedback, "The number of target persons was missing", "The correct description was persons, people, or individuals. You should avoid using informal language. Specific descriptions of persons involved in the activity provide better context from which to make decisions", and "Your description of the activity of the enemy was too vague", respectively Other Performance Measures.

Measures may also include measures of usability, utility, and effectiveness of the tactical communications. These measures may include reflecting the correct level of fidelity to replicate the operating environment, accuracy and tone of the communications from synthetic entities, ease of use, learner engagement, technical or doctrinal accuracy. Methods of obtaining useful measurements for these measures may include structured interviews with both novice and expert users and the use of standardized surveys.

Other measures may also include pitch/tone of voice, amplitude of voice, hand gestures, or clarity of speech through pronunciation or words or occurrences of hesitation words ("um", "ah", etc.).

One Embodiment of a Communication Training System

One embodiment of training communication systems generally comprises the functional elements of FIGS. 1, 3A and 7A implemented in a software program product to be executed by a computer or processor based system. The computer or processor based system may be a generic computer, a specifically programmed computer, a specifically programmed computer-based training simulator or a computer-based training simulator interacting with other generic or specifically designed/programmed devices.

As will be readily apparent to those skilled in the art, training communication systems and methods can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specifically designed computer-based training system, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 6:
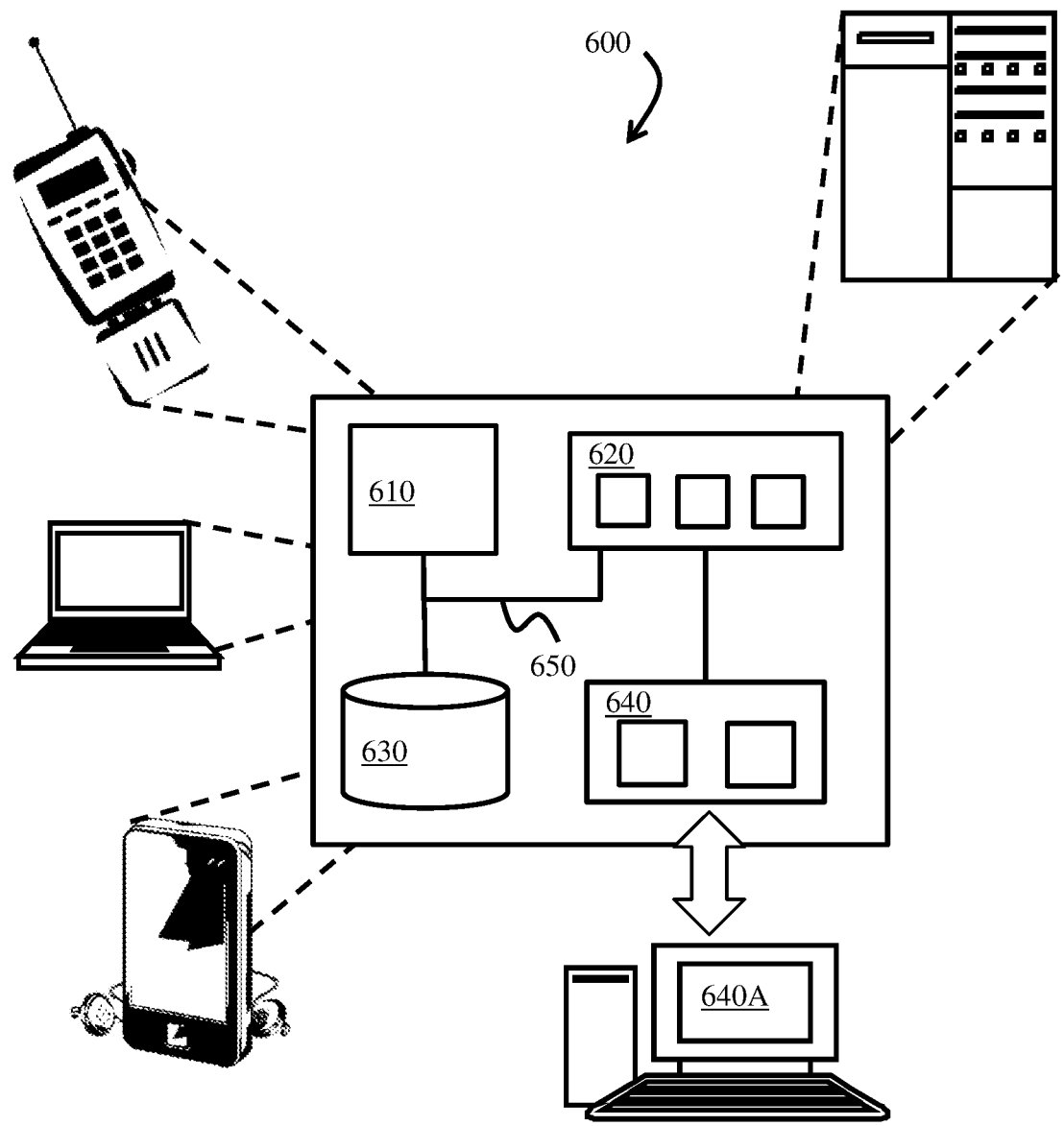
FIG. 6 illustrates one example embodiment of a computer system suitable for a communications training system.

FIG. 6 is a schematic diagram of one embodiment of a computer system 600 by which the disclosed methods for communications training may be carried out. The computer system 600 can be used for the operations described in association with any of the computer implemented methods described herein. The computer system 600 includes at least one processor 610, a memory 620 and an input/output device 640. Each of the components 610, 620, and 640 are operably coupled or interconnected using a system bus 650. The computer system 600 may further comprise a storage device 630 operably coupled or interconnected with the system bus 650.

The processor 610 is capable of receiving the instructions and/or data and processing the instructions of a computer program for execution within the computer system 600. In some embodiments, the processor 610 is a single-threaded processor. In some embodiments, the processor 610 is a multi-threaded processor. The processor 610 is capable of processing instructions of a computer stored in the memory 620 or on the storage device 630 to communicate information to the input/output device 640. Suitable processors for the execution of the computer program instruction include, by way of example, both general and special purpose microprocessors, and a sole processor or one of multiple processors of any kind of computer.

The memory 620 stores information within the computer system 600. Memory 620 may comprise a magnetic disk such as an internal hard disk or removable disk; a magneto-optical disk; an optical disk; or a semiconductor memory device such as PROM, EPROM, EEPROM or a flash memory device. In some embodiments, the memory 620 comprises a transitory or non-transitory computer readable medium. In some embodiments, the memory 620 is a volatile memory unit. In other embodiments, the memory 620 is a non-volatile memory unit.

The processor 610 and the memory 620 can be supplemented by, or incorporated in, ASICs (application-specific integrated circuits).

The storage device 630 may be capable of providing mass storage for the system 600. In various embodiments, the storage device 630 may be, for example only and not for limitation, a computer readable medium such as a floppy disk, a hard disk, an optical disk, a tape device, CD-ROM and DVD-ROM disks, a "thumb" drive, alone or with a device to read the computer readable medium, or any other means known to the skilled artisan for providing the computer program to the computer system for execution thereby. In some embodiments, the storage device 630 comprises a transitory or non-transitory computer readable medium.

In some embodiments, the memory 620 and/or the storage device 630 may be located on a remote system such as a server system, coupled to the processor 610 via a network interface, such as an Ethernet interface.

The input/output device 640 provides input/output operations for the system 600 and may be in communication with a user interface 640A as shown. In one embodiment, the input/output device 640 includes a keyboard and/or pointing device. In some embodiments, the input/output device 640 includes a display unit for displaying graphical user interfaces or the input/output device 640 may comprise a touchscreen. In some embodiments, the user interface 640A comprises devices such as, but not limited to a keyboard, pointing device, display device or a touchscreen that provides a user with the ability to communicate with the input/output device 640.

The computer system 600 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One example embodiment of the systems and methods for communications training may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

One embodiment of a computer or processor based system for communications training is shown in FIG. 7A. As shown, the training environment 710 comprises the environment that the students may be using for their training. The environment may comprise one or more students interacting with a computer-based simulator 740 as the simulation environment through multiple tasks of scenario missions. The students may interface with the computer-based simulator utilizing multiple methods. The student may interface with the simulator directly utilizing a user interface 720D of the simulator, through a user interface device 720A communicating directly to the simulator or through a user interface device (720B and 720C) over a network to all or portions of the computer-based simulator 740. The students may interface independently or they may interface simultaneously and they may interface in a distributed training environment over a distributed data network. The computer-based simulator 740, or the simulator software is comprised of the following integrated modules and services that function within the simulator or across a communication network to generate the mission training environment: simulation dataset 757, the interaction manager module 758, the communication platform modules 752 and the user interface 720D. The computer-based simulator 740 may allow the user to interface with the user interface 720D, a synthetic entity module 750, a performance dataset database 766A and/or a training content database 742A. The synthetic entity may utilize communication platform modules 752, a simulation dataset database 757 and an interaction manager module 758 to provide communication with the user. The performance measurement platform 780 may communicate with the training environment 710 and a performance measure database 782 to provide performance measures to the computer-based simulator 740 and/or the student.

Within the computer-based simulator 740, a selected training content/scenario from the training content database 742A is used by the interaction manager module 758 to dictate the scenarios presented to the user though the user interface. The scenarios include communications from the simulation dataset 757 as well as any other required configurations for the user interface. The training content/scenarios 742A are communicated to the user through the user interface (720A-720D) and may include communications defined by the simulation dataset 757 from the communication platform modules 752. The communications from the student to the user interface is communicated to and received by the synthetic entity 750 though the communication platform modules 752. Within the functions of the synthetic entity 750, the communication platform modules 752 transform the verbal communication to text and communicate the text to the interaction manager module 758. The interaction manager module 758 attempts to align the text received to entries in the training content 742A such as the execution dataset 759 and performance measures 782. This alignment is used to identify the communication received and compare that to the communication expected for the training content/scenario selected. The alignment of the text received to the execution dataset is used to determine the state of the student and the simulation to determine what action should be next performed by the simulator. The alignment of the text received to the performance measures 782 is used to determine an event measure of the student in the simulation. The communication received may also be stored in a performance dataset database 766A to be used to compare the communication received to performance measurement data. The performance dataset may also be communicated to the performance measurement engine server 780 for comparison to a performance measures database 782 to measure the performance of that communication against predefined performance measures. Components of the above system may be co-located or they may be distributed over a communication network. For example, as shown, the performance measures 782, the training content database 742B and/or performance dataset database 766B may not be in the computer-based simulator 740 but may be in communication with the simulator 740 over a data network.

One Example Embodiment of a Communications Training System in Operation

For illustration purposes and not for limitation, the operation of an example embodiment of a communication training system consistent with FIG. 3A will be discussed. This embodiment, a NVTT simulator, progresses the student through a series of UAS scout mission scenarios involving various assets (e.g., manned, unmanned, aerial, and ground-based). The student, while seated at a laptop GCS, interacts with virtual team entities via ad hoc communication over a simulated radio to accomplish increasingly complex missions. NVTT is a web-based system integrating natural language processing components (i.e., speech recognition, speech-to-text, text-to-speech, and language recognition), performance measurement and feedback modules into a One Semi-Automated Forces (OneSAF) flight simulator platform.

To build the training content for this simulator, Aircrew Training Manual (ATM) tasks were mapped to the 10 training missions and a review of missions led to alignment of campaign missions to student events by system type (Shadow or Grey Eagle). Activity diagrams were created to describe the action between the student and the constructive entities as well as the branches and sequels in the action for: Indirect fire, close combat attack, target handover with and without the LTM and LDRF and remote Hellfire designation.

To build the execution data for the simulator, the activity diagrams were used to populate the state transition tables for the state machines.

To build on existing simulation data, completed modifications were made to to OneSAF campaign mission scenarios to account for the simulations use of audio and text data. Mission scripts were created for campaign missions with recommended injects providing students with addition mission situational awareness. A crosswalk was done to ensure alignment of utterances for scenario missions, events, and communications/utterance formats.

Figure 8A:
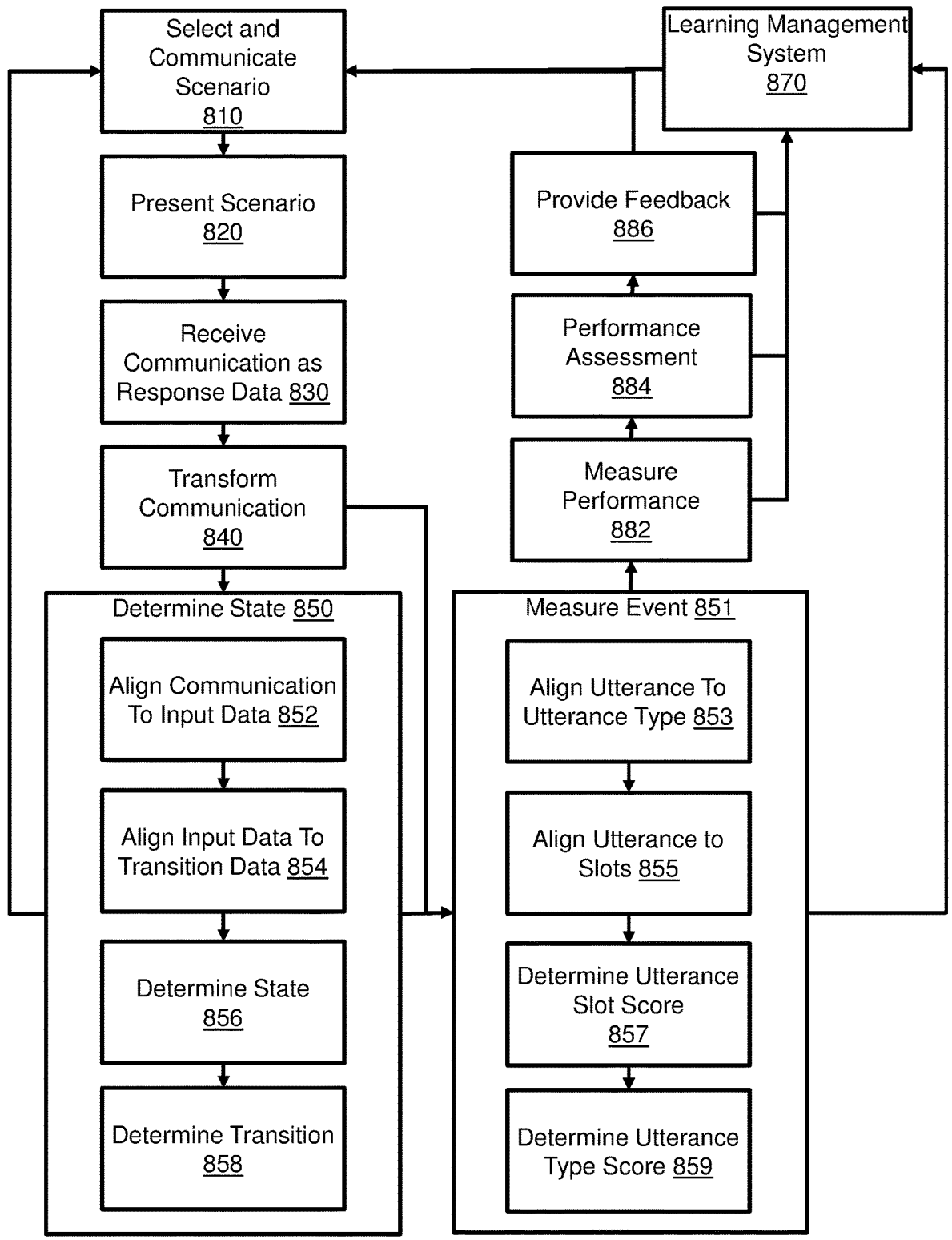
FIG. 8A shows a process diagram of one example embodiment of methods for providing communications training.

Referring to FIG. 8A, in operation, generally the communication training system receives a communication data at 830, transforms the communication data to a text, event data at 840 and at 851, the system aligns the communications received to an expected response data to determine an event measure. The event measure may be the performance measure or multiple events may be used to determine a performance measure. And given the event measure from 851, a performance measure is determined at 882. These features are enabled by the inclusion of, and the special formatting of the datasets used to make these comparisons and assessments. In particular, the predefinition of utterance templates, with expected utterances and corresponding scores for each utterance type, allow for a broad range of responses to result in a broad range of measures to assess the student's performance.

In operation, the system generally allows the user or the system to select a training scenario at 810. With this scenario selected and communicated to the training system, the synthetic entity is then able to, through the user interface of the system, present the scenario to the user at 820 and receive a communication back from the user as a response data at 830. This communication is transformed to text data at 840 and communicated to the interaction manager module to make comparisons to different data step at 850 and 851. The interaction manager module receives the communication data and aligns it with expected input data for the state machines 852 to see whether the response is one of the expected response. If the response aligns with one of the expected responses, at 854 the response is compared to state and transition values in the state model to determine the state of the student and/or the scenario at 856 and determine whether the student and/or the scenario should transition to another action at 858. With or without determining state at 850, the system takes the transformed communication from 840 and measures the event at 851 by aligning the utterance to a predefined utterance type at 853, based on the utterance type the student's utterance is aligned to slots at 855. The utterance slots include predefined phrases or utterance values with corresponding variables such as scores so that when the student's utterance is matches to the predefined phrase or utterance value, a corresponding utterance score is determined for that utterance slot at 857. This utterance slot score, along with any other utterance slot scores for that utterance type, is used to determine the utterance type score at 850. The event measure from 851 is used to determine a performance measure at 883 and the performance measure is assessed against assessment algorithms at 884 to determine a performance assessment. Feedback based on the event measure, the performance measure and/or the performance assessment may be provided at 886. In some embodiments, the event measure, performance measure, performance assessment or other feedback may be provided to a learning management system at 870 for additional analysis such as but not limited to subsequent scenario selection by the training system. FIGS. 8B-8E illustrate further details of the operation of a communications system trainer consistent with FIG. 8A.

Figure 8B:
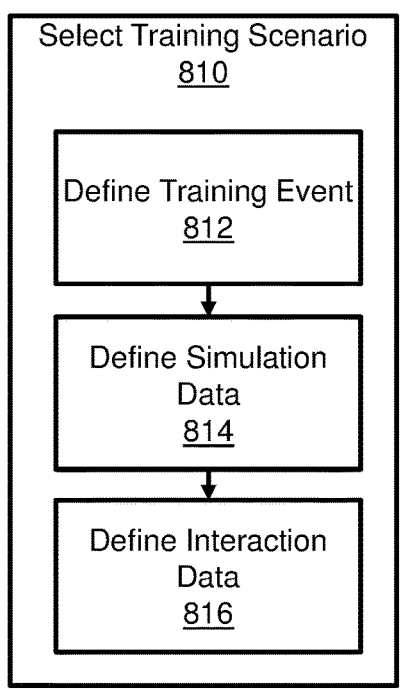
FIGS. 8B-8F show process diagrams of example embodiments of steps within methods for providing communications training.

Referring to FIG. 8B, in some embodiments the step of selecting a training scenario at 810 may comprise defining the training event 812, defining the simulation data 814 necessary to execute the event and defining the expected performance data 816 for this scenario. This information may be received from the training content database and communicated with the training system, in particular with the synthetic entity, for use during the training simulation.

Figure 8C:
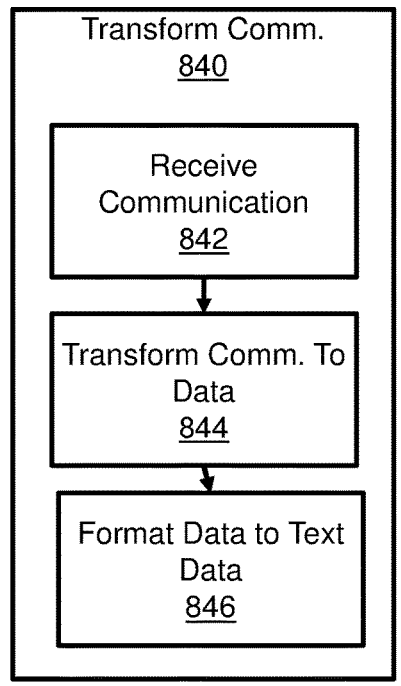

Referring to FIG. 8C, in some embodiments the step of transforming the communication 840 may comprise receiving the communication at 842, transforming the communication to text data at 844 and formatting the data to text data 846 in a format that can be used for aligning with the values in the state machines and the predefined utterance templates.

Figure 8D:
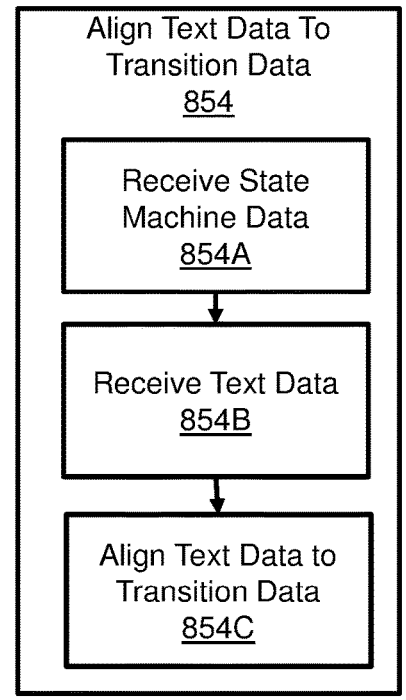

Referring to FIG. 8D, in some embodiments the step of aligning the text data to a transition data at 854 may comprise receiving the state machine data at 854A which may be received from the training content database. The text data representing the student's response can then be received at 854B from the interaction manager and the text data values can be aligned with the predefined transition data value to determine the state of the student and other system components.

Figures 8E, 8F:
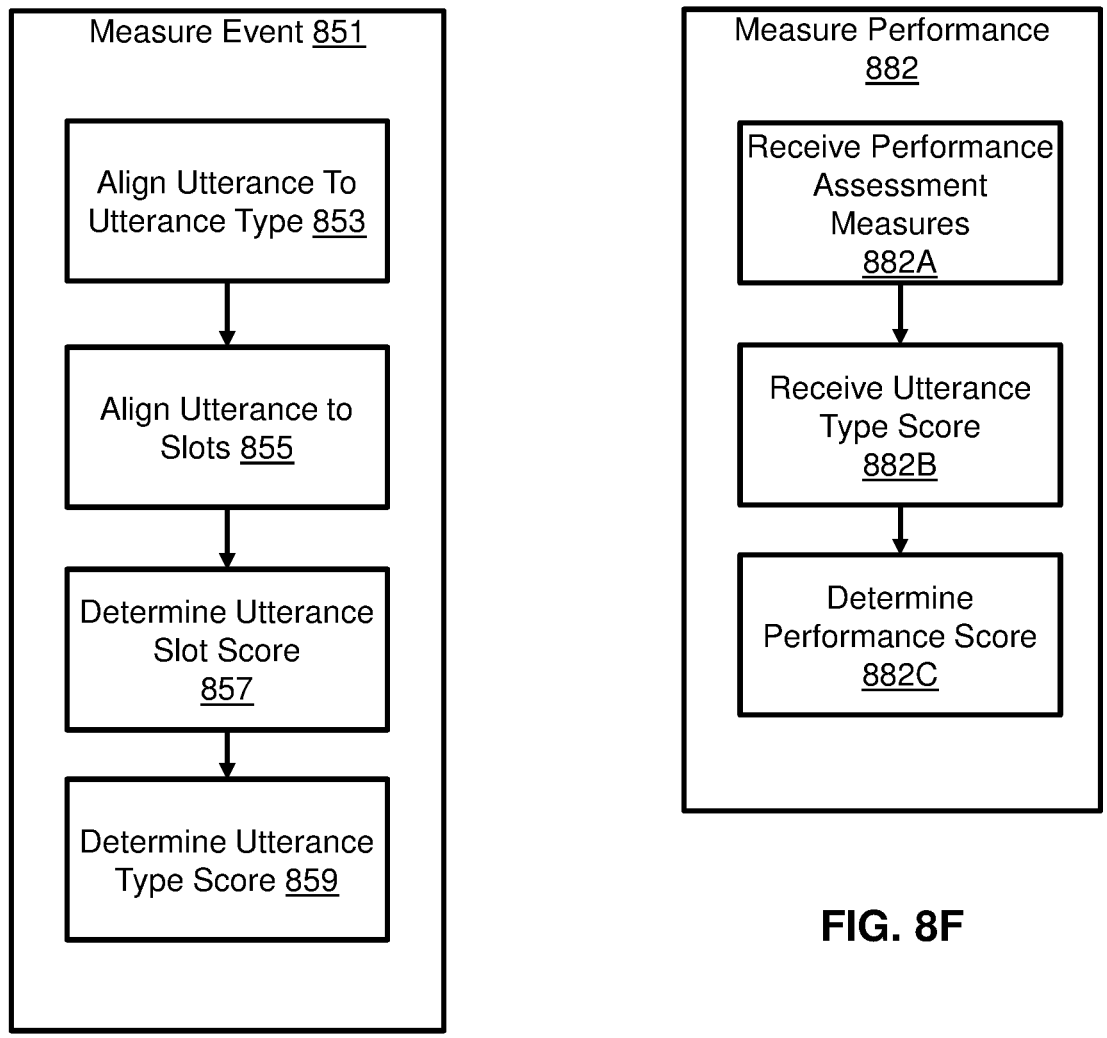

Referring to FIG. 8E, in some embodiment the step of measuring an event at 851 comprises measuring an utterance type as an event type. In this embodiment, the utterance is received as the event data and this utterance is aligned to an utterance type at 853. The utterance type defines the utterance slots according to the predefined utterance templates. At 855, the utterances within the event data are aligned to the slots of that utterance type and at 857 a score is determined for the utterance slots. The score for the utterance slot is determined by aligning the actual utterance with a predefined utterance and using the score associated with that predefined utterance as the slot score. An utterance type score is determined from the event data and the utterance scores at 859. The utterance type score may be one of the event measures such as accuracy, completeness, timeliness, order or brevity.

Referring to FIG. 8F, in some embodiments the step measuring performance 882 may comprise receiving the performance assessment measures at 882A from the PM Engine, receiving the utterance type score at 882B and determining the performance score at 882C based on the assessment measure and the utterance type score. For example, the utterance type scores may be numeric score as defined for that utterance type and the performance assessment measure for that utterance type may be a green/yellow/red score based on the numeric score for that utterance type where a score of 80 or above is green, a score between 60 and 79 is a yellow and a score of 59 or below is a red. In this example, the performance score may be determined by comparing the utterance type score to the performance assessment score. In embodiments that assess the performance of multiple events, performance assessment scores may be determined by more involved algorithms. One such example may be an algorithm requiring a percentage of utterance type scores needing to exceed a threshold number of yellow scores.

FIG. 4A illustrates a set of state machines that represent coordinated steps required to execute close combat attack and require both NVTT core and Voisus to share state updates as the situation unfolds. The coordinated steps outline base cases as well as alternative and failure/recovery modes for target handover and call for fire scenarios. Base cases represent sunny-day/error-free scenarios. The common base case for target handovers applies to handovers from student (as a payload operator) to ground and rotating wing air platforms and is pictured in FIG. 4A. As noted, there are a large number of failure and recovery modes for these scenarios have been grown to handle. Those failure modes are themselves represented as nested state machines. Nested state machines that allow recovery from failure modes get grafted into the base case at the appropriate transition in FIG. 4A marked $G_{x}$.

Figure 5:
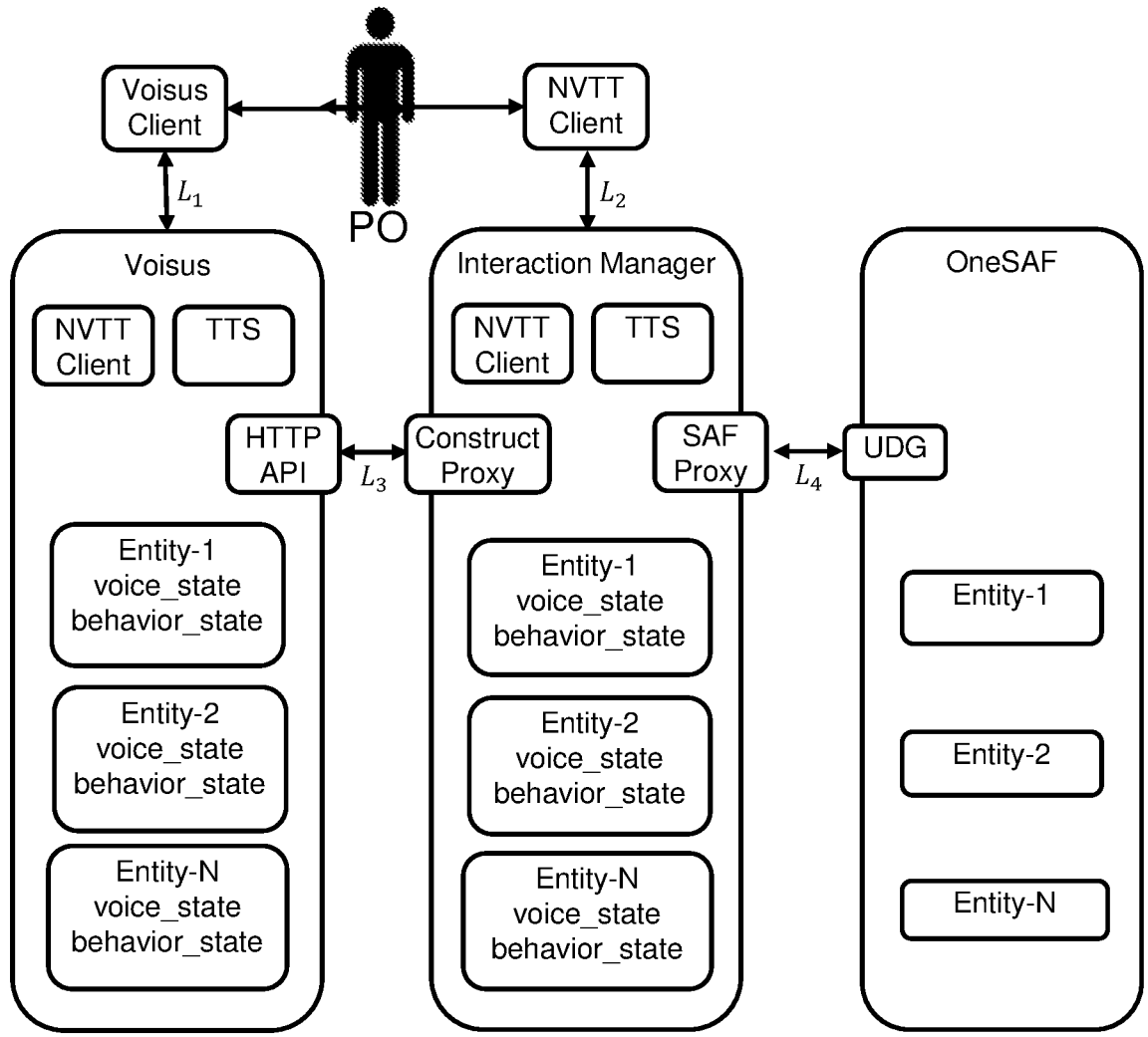
FIG. 5 illustrates an example embodiment of an architecture to coordinate dialog state across communication training system components.

FIG. 5 also illustrates the processes involved in state synchronization of the interaction manager module (MissionExecution) to keep the communication platform state (here Voisus) consistent with the state of the simulation data (here OneSAF) so that the event information shared with the student through the audio interface (here Voisus client) is consistent with the event information shared with the student through the other simulator interfaces (here NVTT client).

Table 2 of FIG. 10 depicts the processes involved in enabling this stepwise progression. Note that both ConstructProxy::Voisus and SAFProxy::UDG are HTTP connections and as such operate outside of the simulation bus (DIS in the current case) consistent with FIG. 5. As the student progresses through the verbal communications required as part of the cooperative engagement with the synthetic entity (in this case Apache, but the same holds true for Stryker or other ground entities), the MissionExecution (as the interaction manager) continuously collects state changes from ASTi through its ConstructProxy and reconciles them with state it manages as it executes SAF behaviors and monitors state coming out of the SAF via SAFProxy. The result is a step-wise progression through the coordinated state machines defined for target handover, whether it be with or without weapons, or with one of the weapons supported by the coordinating platform. Depending on the NVTT mission type (training versus campaign) either NVTT's LMS or DDSM components are responsible for this reconciling of state and stimulation of OneSAF.

The tables shown in FIGS. 9 and 10 are extracted from the NVTT state machine documentation and follow the sunny-day target handover scenario outlined in FIG. 4A.

Feedback Forms.

At the conclusion of each mission, the student may receive tailored feedback in several forms based on the performance measure results such as those listed below.

Stoplight indicator feedback: Green, red (and yellow, when applicable) indicators of progress on specific missions, training objectives, and measures.

Narrative feedback: canned text generated from patterns of scores within a mission/training objective; feedback contains description of performance plus recommendations for doing better. The feedback contains (a) 1-2 sentences on what the expected competencies were for this report; (b) short list of bullets of how the student's report was deficient; (c) instructions to listen to the Sample Report to see how that could have been reported better.

Audio report comparison feedback: listening to your report vs. an expert (Sample report); provides comparisons for cadence, emphasis, and clarity that narrative feedback shouldn't have to handle.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A computer-based communications training simulator configured to determine a performance measure for a student, the computer-based communications training simulator comprising:

a memory configured to store a training content data set comprising a training event data;

the training event data comprising a simulation data and an event type;

a communication platform configured to present the simulation data to a student and receive a response data of the student to the simulation data;

each of the response data comprises an actual utterance of the student;

the communication platform configured to receive a first response data of the student and transform the first response data to a first text data;

an interaction manager module configured to receive the first text data to determine a first event data;

the communication platform configured to receive a second response data of the student and transform the second response data to a second text data;

the interaction manager module configured to receive the second text data to determine a second event data;

the interaction manager module configured to determine a first event measure for the student based on the first event data and the event type;

the interaction manager module configured to determine a second event measure for the student based on the second event data and the event type;

a measurement environment configured to execute a performance score algorithm to determine a performance score from the first event measure and the second event measure as a performance measure for the student;

wherein the event type comprises an utterance type;

wherein the measurement environment comprises a predefined utterance scoring data comprising:

the utterance type defining an utterance slot, the utterance slot corresponding to a plurality of utterance slot values and each utterance slot value corresponding to an expected utterance of the student, and the utterance slot value also corresponding to an utterance slot score; and wherein the interaction manager module is configured to:
align the first event data of the student to a first utterance slot value to define a first utterance slot score as the first event measure for the student, and
align the second event data of the student to a second utterance slot value to define a second utterance slot score as the second event measure for the student.

2. The computer-based communications training simulator of claim 1 wherein the measurement environment further comprises a predefined performance scoring data corresponding to the first event data and the second event data.

3. The computer-based communications training simulator of claim 1 wherein the performance score from the first event measure and the second event measure comprises a sum of the first event measure and the second event measure.

4. The computer-based communications training simulator of claim 1 wherein the interaction manager module is further configured to present an audio data to the student based on the simulation data and the response data.

5. The computer-based communications training simulator of claim 1 wherein the performance measure comprises an accuracy event measure.

6. The computer-based communications training simulator of claim 1 wherein the performance measure comprises a completeness event measure.

7. The computer-based communications training simulator of claim 1 wherein one of the first event measure or the second event measure comprises a timeliness event measure.

8. The computer-based communications training simulator of claim 1 wherein one of the first event measure or the second event measure comprises a brevity event measure.

9. The computer-based communications training simulator of claim 1 wherein the performance score from the first event measure and the second event measure comprises an order event measure based on a sequence of the first event measure and the second event measure.

10. The computer-based communications training simulator of claim 1 wherein:
the interaction manager module is further configured to align the first event data of the student to a first utterance slot to define a first utterance slot score as the first event measure for the student;
the interaction manager module is further configured to align the second event data of the student to a second utterance slot to define a second utterance slot score as the second event measure for the student; and
the interaction manager module is configured to align the first event data and second event data of the student to the first and the second utterance slot according to an utterance slot score metric defined as:

$$Score_{alignment} = \frac{2|C|}{|A| + |B|}$$

wherein:
|A| is a number of content words in an utterance slot,
|B| is a number of content words in an event data,
|C| is a number of words that are aligned, and
the event data with a highest utterance slot score is selected as a best aligned event data for the utterance slot.

11. A computer-based communications training simulator configured to determine a performance measure for a student, the computer-based communications training simulator comprising:

a memory configured to store a training content data set comprising a training event data;
the training event data defining a plurality of simulation data and an event type;
a user interface configured to present the simulation data to a student and receive a response data of the student to the simulation data;
a communication platform configured to receive the response data of the student and transform the response data to a text data;
an interaction manager module configured to receive the text data to determine an event data;
the event type comprises an utterance type and the response data comprises an actual utterance of the student;
a measurement environment comprises a predefined utterance scoring data comprising:
the utterance type defining an utterance slot,
the utterance slot corresponding to a plurality of utterance slot values and each utterance slot value corresponding to an expected utterance of the student, and
the utterance slot value also corresponding to an utterance slot score;
the interaction manager module is further configured to align the event data of the student to the utterance slot value to define the utterance slot score as an event measure for the student; and
the measurement environment further comprises:
a predefined performance scoring data,
a performance data comprising the event measure for the student, and
a performance score algorithm configured to determine a performance measure for the student based on the performance data and the predefined performance scoring data.

12. The computer-based communications training simulator of claim 11 wherein the interaction manager module is further configured to present an audio data to the student based on the simulation data and the response data.

13. The computer-based communications training simulator of claim 11 wherein the performance measure of the student comprises one event measure selected from the group consisting of:
an accuracy performance measure;
a completeness performance measure;
a timeliness performance measure;
a brevity performance measure; and
an order performance measure.

14. A computer-based communications training simulator configured to automatically determine a next simulation to present a student, the computer-based communications training simulator comprising:
a memory configured to store a training content data set comprising a simulation data and an event type;
the event type defining a transition data based on an event data and a current state of the student;
a user interface configured to present the simulation data to a student having the current state of the student;
the user interface further configured to receive an actual utterance of the student to the simulation data;
a communication platform configured to receive the actual utterance of the student and transform the actual utterance to a text data; and an interaction manager module configured to:
  receive the text data as the event data, and
  define a next simulation data to present to the student based on the event data, the current state of the student and the transition data;
wherein the interaction manager module is further configured to align the event data of the student to an utterance slot to define an utterance slot score as an event measure for the student; and
the interaction manager module is configured to align the event data of the student to the utterance slot according to an utterance slot score metric defined as:

$$Score_{alignment} = \frac{2|C|}{|A| + |B|}$$

wherein:
  |A| is a number of content words in the utterance slot,
  |B| is a number of content words in the event data,
  |C| is a number of words that are aligned, and
  the event data with a highest utterance slot score is selected as a best aligned event data of the student to the utterance slot.

15. The computer-based communications training simulator of claim 14 wherein the next simulation data comprises an audio data.

16. The computer-based communications training simulator of claim 14 wherein the transition data comprises a transition table relating the event data, the current state of the student and the next simulation data.

17. The computer-based communications training simulator of claim 14 wherein
  the interaction manager module is further configured to align the event data of the student to an utterance slot value to define an utterance slot score as an event measure for the student; and
  the interaction manager module is further configured to determine the current state of the student based on the event data.

18. The computer-based communications training simulator of claim 14 wherein the event measure of the student comprises one event measure selected from the group consisting of:
  an accuracy performance measure;
  a completeness performance measure;
  a timeliness performance measure;
  a brevity performance measure; and
  an order performance measure.

* * * * *